(12) United States Patent
Leung et al.

(10) Patent No.: US 9,955,344 B2
(45) Date of Patent: *Apr. 24, 2018

(54) MOBILE NETWORK DEVICE MULTI-LINK OPTIMIZATIONS

(71) Applicant: Cisco Technology, Inc., San Jose, CA (US)

(72) Inventors: Kent Leung, Mountain View, CA (US); Alpesh Patel, Pleasanton, CA (US); Naveen Paulkandasamy, San Jose, CA (US); Stefan Raab, South Riding, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/801,680

(22) Filed: Jul. 16, 2015

(65) Prior Publication Data

US 2015/0327058 A1 Nov. 12, 2015

Related U.S. Application Data

(63) Continuation of application No. 13/975,105, filed on Aug. 23, 2013, now Pat. No. 9,113,437, which is a (Continued)

(51) Int. Cl.
| | | |
|---|---|---|
| *H04W 4/00* | (2009.01) | |
| *H04B 7/216* | (2006.01) | |
| *H04W 8/26* | (2009.01) | |
| *H04W 8/08* | (2009.01) | |
| *H04W 8/12* | (2009.01) | |
| *H04W 60/00* | (2009.01) | |
| *H04W 8/06* | (2009.01) | |
| *H04W 80/04* | (2009.01) | |

(52) U.S. Cl.
CPC ............ *H04W 8/26* (2013.01); *H04W 8/082* (2013.01); *H04W 8/12* (2013.01); *H04W 60/005* (2013.01); *H04W 8/065* (2013.01); *H04W 80/04* (2013.01)

(58) Field of Classification Search
CPC ...... H04W 8/04; H04W 40/34; H04W 84/005
See application file for complete search history.

(56) References Cited

U.S. PATENT DOCUMENTS

| | | |
|---|---|---|
| 6,195,705 B1 | 2/2001 | Leung |
| 6,230,012 B1 | 5/2001 | Willkie et al. |
| | (Continued) | |

OTHER PUBLICATIONS

C. Perkins, Ed., "IP Mobility Support for IPv4," Nokia Research Center, Network Working Group Request for Comment: RFC 3344; Aug. 2002.

(Continued)

*Primary Examiner* — Melanie Jagannathan
(74) *Attorney, Agent, or Firm* — Polsinelli PC

(57) ABSTRACT

The disclosed embodiments support mobility internal and external to enterprise networks. Service providers provide mobility by providing Home Agent functionality corresponding to each Enterprise network. In this manner, mobility may be provided to Mobile Nodes both internal and external to their enterprise networks. Moreover, data packets may be transmitted by Mobile Nodes to Correspondent Nodes, whether they are within their enterprise network, the Service Provider network, or the Internet.

20 Claims, 15 Drawing Sheets

Related U.S. Application Data continuation of application No. 11/411,744, filed on Apr. 25, 2006, now Pat. No. 8,526,404.

(56) References Cited

U.S. PATENT DOCUMENTS

| | | |
|---|---|---|
| 6,430,698 B1 | 8/2002 | Khalil et al. |
| 6,452,920 B1 | 9/2002 | Comstock |
| 6,515,974 B1 | 2/2003 | Inoue et al. |
| 6,567,664 B1 | 5/2003 | Bergenwall et al. |
| 6,621,810 B1 | 9/2003 | Leung |
| 6,636,498 B1 * | 10/2003 | Leung .................... H04W 8/04 370/328 |
| 6,721,291 B1 | 4/2004 | Bergenwall et al. |
| 6,721,297 B2 | 4/2004 | Korus et al. |
| 6,738,362 B1 | 5/2004 | Xu et al. |
| 6,763,007 B1 | 7/2004 | La Porta et al. |
| 6,765,892 B1 | 7/2004 | Leung et al. |
| 6,842,462 B1 | 1/2005 | Ramjee et al. |
| 7,822,858 B2 | 10/2010 | Kumarasamy et al. |
| 7,860,037 B2 | 12/2010 | Chen |
| 8,340,699 B2 | 12/2012 | Testone et al. |
| 8,346,249 B2 | 1/2013 | Niemenmaa et al. |
| 8,526,404 B2 * | 9/2013 | Leung .................... H04W 8/12 370/328 |
| 2001/0021175 A1 | 9/2001 | Haverinen |
| 2003/0182433 A1 | 9/2003 | Kulkarni et al. |
| 2004/0047348 A1 * | 3/2004 | O'Neill .................... H04L 63/0892 370/389 |
| 2004/0073642 A1 | 4/2004 | Iyer |
| 2005/0101321 A1 * | 5/2005 | Ikeda .................... H04W 8/065 455/435.1 |
| 2005/0177647 A1 | 8/2005 | Anantha et al. |
| 2005/0207382 A1 * | 9/2005 | Hirashima .................... H04W 8/12 370/338 |
| 2005/0237983 A1 * | 10/2005 | Khalil .................... H04L 63/061 370/338 |
| 2006/0171365 A1 | 8/2006 | Borella |
| 2007/0248062 A1 | 10/2007 | Leung et al. |
| 2008/0062917 A1 | 3/2008 | Oguchi |
| 2008/0192679 A1 * | 8/2008 | Dempo .................... H04L 45/00 370/328 |
| 2009/0190552 A1 | 6/2009 | Balay et al. |
| 2010/0246545 A1 | 9/2010 | Berzin |
| 2011/0075571 A1 | 3/2011 | Hao et al. |
| 2012/0320908 A1 | 12/2012 | Silver et al. |

OTHER PUBLICATIONS

D. Johnson, C. Perkins, J. Arkko, "Mobility Support IPv6," Network Working Group Request for Comment: RFC 3775; Jun. 2004.

* cited by examiner

1. MN Moves From SP to Enterprise Network

1A. Peer (CN) is server in Enterprise A

| Location of MN | Traffic to/from MN |
|---|---|
| Started At: MN@SP | MN-> HA(sp)->VPN-> HA(ent)->CN — 404<br>CN-> HA(ent)->VPN-> HA(sp)->MN — 406 |
| Moved To: MN@ENT | MN-> HA(ent)->CN — 408<br>CN-> HA(ent)->MN — 410 |

1B. Peer (CN) is server in Mobile Operator

| Location of MN | Traffic to/from MN |
|---|---|
| Started At: MN@SP | MN-> HA(sp)->CN — 414<br>CN-> HA(sp)->MN — 416 |
| Moved To: MN@ENT | MN-> HA(ent)->VPN-> HA(sp)->CN — 418<br>CN-> HA(sp)->VPN-> HA(ent)->MN — 420 |

1C. Peer (CN) is server in Enterprise B

| Location of MN | Traffic to/from MN |
|---|---|
| Started At: MN@SP | MN-> HA(sp)-> NAT(sp)->CN — 424<br>CN-> NAT(sp)-> HA(sp)->MN — 426 |
| Moved To: MN@ENT | MN-> HA(ent)-> VPN-> HA(sp)-> NAT(sp)->CN — 428<br>CN-> NAT(sp)-> HA(sp)-> VPN-> HA(ent)->MN — 430 |

FIG. 4A

2. MN Moves From Enterprise To SP Network

| 2A. Peer (CN) is server in Enterprise A | Location of MN | Traffic to/from MN |
|---|---|---|
| Started At: | MN@ENT | MN->HA(ent)->CN — 434<br>CN->HA(ent)->MN — 436 |
| Moved To: | MN@SP | MN->HA(sp)->VPN->HA(ent)->CN — 438<br>CN->HA(ent)->VPN->HA(sp)->MN — 440 |

| 2B. Peer (CN) is server in Mobile Operator | Location of MN | Traffic to/from MN |
|---|---|---|
| Started At: | MN@ENT | MN->HA(ent)->VPN->HA(sp)->CN — 444<br>CN->HA(sp)->VPN->HA(ent)->MN — 446 |
| Moved To: | MN@SP | MN->HA(sp)->CN — 448<br>CN->HA(sp)->MN — 450 |

| 2C. Peer (CN) is server in Enterprise B | Location of MN | Traffic to/from MN |
|---|---|---|
| Started At: | MN@ENT | MN->HA(ent)->VPN->HA(sp)->NAT(sp)->CN — 454<br>CN->NAT(sp)->HA(sp)->VPN->HA(ent)->MN — 456 |
| Moved To: | MN@SP | MN->HA(sp)->NAT(sp)->CN — 458<br>CN->NAT(sp)->HA(sp)->MN — 460 |

*FIG. 4B*

1. MN Moves From SP to Enterprise Network

| 1A. Peer (CN) is server in Enterprise A | Location of MN | Traffic to/from MN |
|---|---|---|
| Started At: | MN@SP | MN->HA(sp)->VPN->HA(ent)->CN ~604<br>CN->HA(ent)->VPN->HA(sp)->MN ~606 |
| Moved To: | MN@ENT | MN->HA(ent)->CN ~608<br>CN->HA(ent)->MN ~610 |

| 1B. Peer (CN) is server in Mobile Operator | Location of MN | Traffic to/from MN |
|---|---|---|
| Started At: | MN@SP | MN->HA(sp)->CN ~614<br>CN->HA(sp)->MN ~616 |
| Moved To: | MN@ENT | MN->HA(ent)->VPN->HA(sp)->CN ~618<br>CN->HA(sp)->VPN->HA(ent)->MN ~620 |

| 1C. Peer (CN) is server in Enterprise B | Location of MN | Traffic to/from MN |
|---|---|---|
| Started At: | MN@SP | MN->HA(sp)->VPN->HA(ent)->NAT(ent)->CN ~624<br>CN->NAT(ent)->HA(ent)->VPN->HA(sp)->MN ~626 |
| Moved To: | MN@ENT | MN->HA(ent)->NAT(ent)->CN ~628<br>CN->NAT(ent)->HA(ent)->MN ~630 |

*FIG. 6A*

2. MN Moves From Enterprise To SP Network

2A. Peer (CN) is server in Enterprise A — 632

| Location of MN | Traffic to/from MN |
|---|---|
| *Started At:* MN@ENT | MN->HA(ent)->CN — 634 |
| | CN->HA(ent)->MN — 636 |
| *Moved To:* MN@SP | MN->HA(sp)->VPN->HA(ent)->CN — 638 |
| | CN->HA(ent)->VPN->HA(sp)->MN — 640 |

2B. Peer (CN) is server in Mobile Operator — 642

| Location of MN | Traffic to/from MN |
|---|---|
| *Started At:* MN@ENT | MN->HA(ent)->VPN->HA(sp)->CN — 644 |
| | CN->HA(sp)->VPN->HA(ent)->MN — 646 |
| *Moved To:* MN@SP | MN->HA(sp)->CN — 648 |
| | CN->HA(sp)->MN — 650 |

2C. Peer (CN) is server in Enterprise B — 652

| Location of MN | Traffic to/from MN |
|---|---|
| *Started At:* MN@ENT | MN->HA(ent)->NAT(ent)->CN — 654 |
| | CN->NAT(ent)->HA(ent)->MN — 656 |
| *Moved To:* MN@SP | MN->HA(sp)->VPN->HA(ent)->NAT(ent)->CN — 658 |
| | CN->NAT(ent)->HA(ent)->VPN->HA(sp)->MN — 660 |

*FIG. 6B*

1. MN Moves From SP to Enterprise Network

| 1A. Peer (CN) is server in Enterprise A | Location of MN | Traffic to/from MN |
|---|---|---|
| Started At: | MN@SP | MN->HA(sp)->VPN->HA(ent)->CN — 804 <br> CN->HA(ent)->VPN->HA(sp)->MN — 806 |
| Moved To: | MN@ENT | MN->HA(ent)->CN — 808 <br> CN->HA(ent)->MN — 810 |

| 1B. Peer (CN) is server in Mobile Operator | Location of MN | Traffic to/from MN |
|---|---|---|
| Started At: | MN@SP | MN->HA(sp)->CN — 814 <br> CN->HA(sp)->MN — 816 |
| Moved To: | MN@ENT | MN->HA(ent)->VPN->HA(sp)->CN — 818 <br> CN->HA(sp)->VPN->HA(ent)->MN — 820 |

| 1C. Peer (CN) is server in Enterprise B | Location of MN | Traffic to/from MN |
|---|---|---|
| Started At: | MN@SP | MN->HA(sp)->NAT(sp)->CN — 824 <br> CN->NAT(sp)->HA(sp)->MN — 826 |
| Moved To: | MN@ENT | MN->HA(ent)->VPN->HA(sp)->NAT(sp)->CN — 828 <br> CN->NAT(sp)->HA(sp)->VPN->HA(ent)->MN — 830 |

FIG. 8A

2. MN Moves From Enterprise To SP Network

2A. Peer (CN) is served in Enterprise A

| Location of MN | Traffic to/from MN |
|---|---|
| *Started At:* MN@ENT | MN->HA(ent)->CN — 834<br>CN->HA(ent)->MN — 836 |
| *Moved To:* MN@SP | MN->HA(sp)->VPN->HA(ent)->CN — 838<br>CN->HA(ent)->VPN->HA(sp)->MN — 840 |

2B. Peer (CN) is served in Mobile Operator

| Location of MN | Traffic to/from MN |
|---|---|
| *Started At:* MN@ENT | MN->HA(ent)->VPN->HA(sp)->CN — 844<br>CN->HA(sp)->VPN->HA(ent)->MN — 846 |
| *Moved To:* MN@SP | MN->HA(sp)->CN — 848<br>CN->HA(sp)->MN — 850 |

2C. Peer (CN) is served in Enterprise B

| Location of MN | Traffic to/from MN |
|---|---|
| *Started At:* MN@ENT | MN->HA(ent)->NAT(ent)->CN — 854<br>CN->NAT(ent)->HA(ent)->MN — 856 |
| *Moved To:* MN@SP | MN->HA(sp)->VPN->HA(ent)->NAT(ent)->CN — 858<br>CN->NAT(ent)->HA(ent)->VPN->HA(sp)->MN — 860 |

*FIG. 8B*

| Source Address 902 | Source port 904 | Destination Address 906 | Destination port 908 | Flow ID (IPv6) 910 | Action Taken 912 |
|---|---|---|---|---|---|
|  |  |  |  |  |  |
|  |  |  |  |  |  |

FIG. 9

MOBILE NETWORK DEVICE MULTI-LINK OPTIMIZATIONS

RELATED APPLICATIONS

This application is a continuation of U.S. application Ser. No. 13/975,105, filed on Aug. 23, 2013, which is a continuation of U.S. application Ser. No. 11/411,744, filed on Apr. 25, 2006, both of which are incorporated herein by reference in their entirety and for all purposes.

BACKGROUND OF THE INVENTION

The present invention relates to Mobile IP network technology. More particularly, the present invention relates to supporting mobility of a Mobile Node internal and external to its enterprise network.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one sub-network and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

The Mobile IP process in a Mobile IPv4 environment is illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In a Third Generation Partnership Project 2 (3GPP2)/CDMA2000 network, the Foreign Agent is implemented in what is generally referred to as a Packet Data Serving Node (PDSN). In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

Currently, Home Agents are located in the Mobile Node's home network. Such a home network is typically referred to as an enterprise network. When data packets are transmitted to the Mobile Node, they are typically routed to the Mobile Node via the Mobile Node's Home Agent located in the Mobile Node's enterprise network. Unfortunately, as the Mobile Node roams further from its home network, the routing of data packets becomes more inefficient.

In view of the above, it would be beneficial if data packets could be forwarded via Mobile IP in a more efficient manner.

SUMMARY OF THE INVENTION

The disclosed embodiments support mobility of a Mobile Node internal to its enterprise network, as well as external to its enterprise network. In some embodiments, this is accomplished by supporting mobility services at the Service Provider network. In this manner, packets may be routed external to enterprise network in an efficient manner.

In accordance with one aspect of the invention, a Service Provider network supports a different Home Agent for each enterprise network for which it supports mobility services. The Home Agent may be a physical or virtual Home Agent. For instance, a virtual Home Agent in the Service Provider network may maintain a routing table for a corresponding enterprise network.

In accordance with another aspect of the invention, the role of a Home Agent may differ on a per Mobile Node basis. In other words, a Home Agent may be a primary (i.e., serving Home Agent) for one Mobile Node, and be a secondary Home Agent for another Mobile Node. More particularly, the Home Agent in an enterprise network may act as the secondary Home Agent, while the corresponding Home Agent for the enterprise network that is located in the Service Provider network may act as the primary Home Agent, or vice versa.

In accordance with one embodiment, registration requests are processed by the serving Home Agent. The serving Home Agent then signals to the secondary Home Agent when the Mobile Node is successfully registered with the serving Home Agent. For instance, the notification may be the registration request. Such a registration request may include an extension indicating that the registration request is being forwarded from the primary Home Agent.

In accordance with another embodiment, when the secondary Home Agent receives the notification from the serving Home Agent, it updates its mobility binding table to include a binding for the Mobile Node. In addition, the binding is marked to indicate that the binding is a secondary binding. In this manner, the secondary Home Agent may maintain information for the Mobile Node (in the event that it should later become the primary Home Agent for the Mobile Node), as well as acknowledge that data packets addressed to the Mobile Node are to be forwarded to the primary Home Agent, if they are received by the secondary Home Agent. Upon receipt of a second registration request from the Mobile Node, the secondary Home Agent may change the binding to a primary binding, as well as send a notification to the serving Home Agent of its corresponding change in status to the secondary Home Agent. In this manner, the initial primary and secondary Home Agents may exchange roles.

In accordance with another aspect of the invention, the serving Home Agent is responsible for tunneling data packets to the Mobile Node. Upon receipt of data packets addressed to the Mobile Node, the non-serving Home Agent tunnels data packets destined to the Mobile Node to the serving Home Agent. The serving Home Agent is then responsible for tunneling packets to the Mobile Node.

In accordance with another aspect of the invention, data packets transmitted by the Mobile Node may be routed in a variety of ways, depending upon the destination address of the data packets. In accordance with one embodiment, data traffic transmitted to a Correspondent Node located in the Service Provider network is routed to the Service Provider's Home Agent by the Enterprise network's Home Agent. (Where the Mobile Node is in the Service Provider network, data traffic transmitted within the Service Provider network is routed locally by the Service Provider's Home Agent.) In accordance with another embodiment, traffic sent by the Mobile Node to a Correspondent Node located in an enterprise network are routed to the Enterprise network's Home Agent by the Service Provider's Home Agent. (Where the Mobile Node is in the same enterprise network as the Correspondent Node, data traffic is routed locally by the Enterprise Home Agent.)

In accordance with yet another aspect of the invention, data traffic transmitted to a Correspondent Node having an Internet address are routed to a Home Agent where a NAT module is implemented. The NAT module may be implemented at the Enterprise network or at the Service Provider network. The routing of traffic may be established via a default route in a routing table. Alternatively, the routing of traffic may be intelligently implemented by tracking each session/data flow and routing traffic to the same NAT module for that data flow.

In accordance with another aspect of the invention, the invention pertains to a system operable to perform and/or initiate any of the disclosed methods in a mobile network device (e.g., Mobile Node), Home Agent, or Correspondent Node. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

BRIEF DESCRIPTION OF THE DRAWINGS

FIG. 4A is a diagram illustrating the flow of data packets in a system such as that illustrated in FIG. 3 when a Mobile Node roams from the Service Provider network to the Enterprise network in accordance with one embodiment of the invention.

FIG. 4B is a diagram illustrating the flow of data packets in a system such as that illustrated in FIG. 3 when a Mobile Node roams from the Enterprise network to the Service Provider network in accordance with one embodiment of the invention.

FIG. 6A is a diagram illustrating the flow of data packets in a system such as that illustrated in FIG. 5 when a Mobile Node roams from the Service Provider network to the Enterprise network in accordance with one embodiment of the invention.

FIG. 6B is a diagram illustrating the flow of data packets in a system such as that illustrated in FIG. 5 when a Mobile Node roams from the Enterprise network to the Service Provider network in accordance with one embodiment of the invention.

FIG. 8A is a diagram illustrating the flow of data packets in a system such as that illustrated in FIG. 7 when a Mobile Node roams from the Service Provider network to the Enterprise network in accordance with one embodiment of the invention.

FIG. 8B is a diagram illustrating the flow of data packets in a system such as that illustrated in FIG. 7 when a Mobile Node roams from the Enterprise network to the Service Provider network in accordance with one embodiment of the invention.

FIG. 9 is a diagram illustrating an exemplary policy routing table that may be implemented in a system such as that illustrated in FIG. 7.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable mobile network operators (i.e., service providers) to provide mobility services using Mobile IP. This is accomplished via a Home Agent in the Service Provider network that acts as a counterpart to a Home Agent in an enterprise network. For each Mobile IP session for a Mobile Node, only one of the Home Agents is responsible for forwarding data packets to the Mobile Node.

Figure 1:
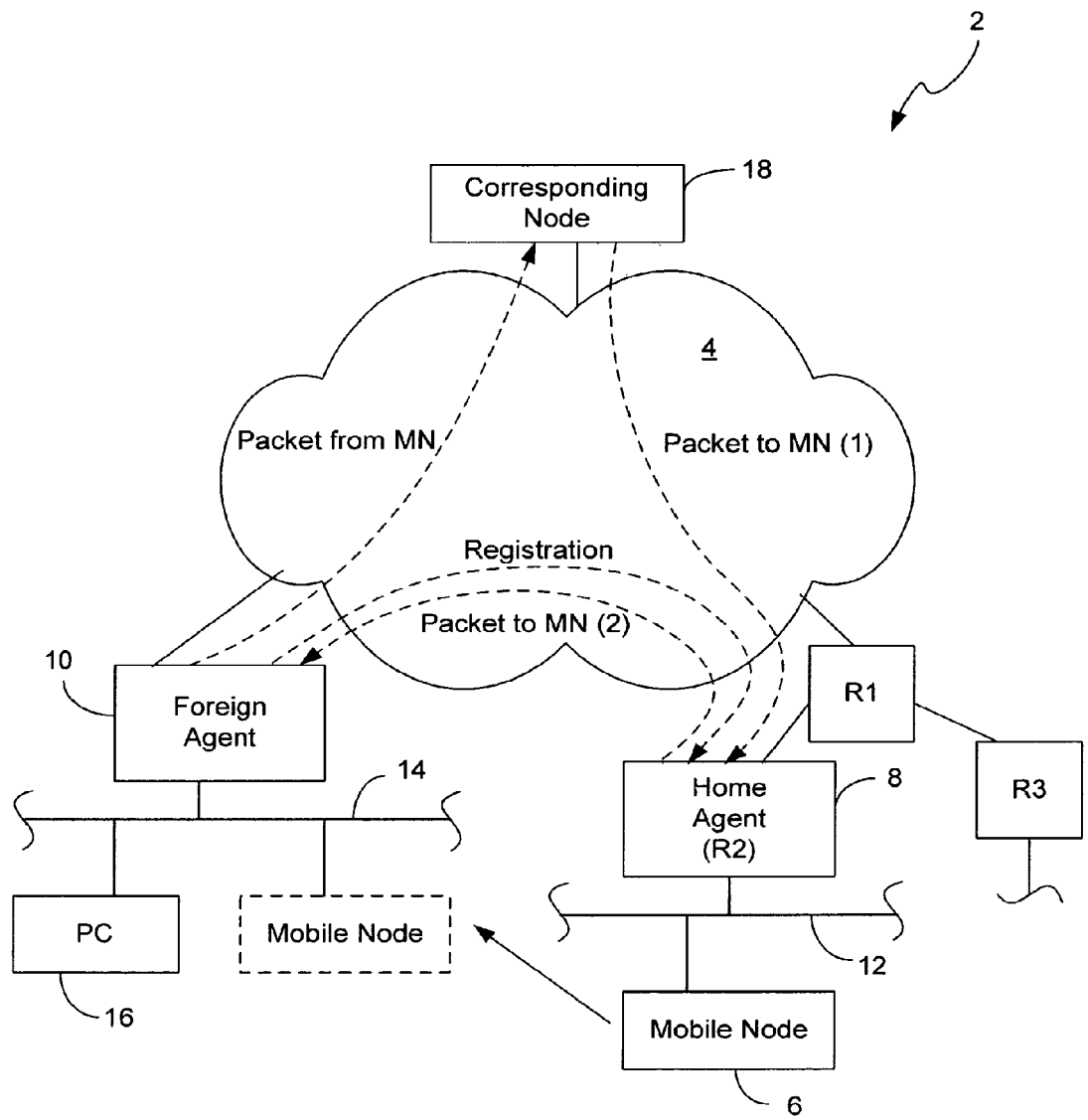
FIG. 1 is a diagram of a Mobile IP network segment and associated environment.
Figure 2A:
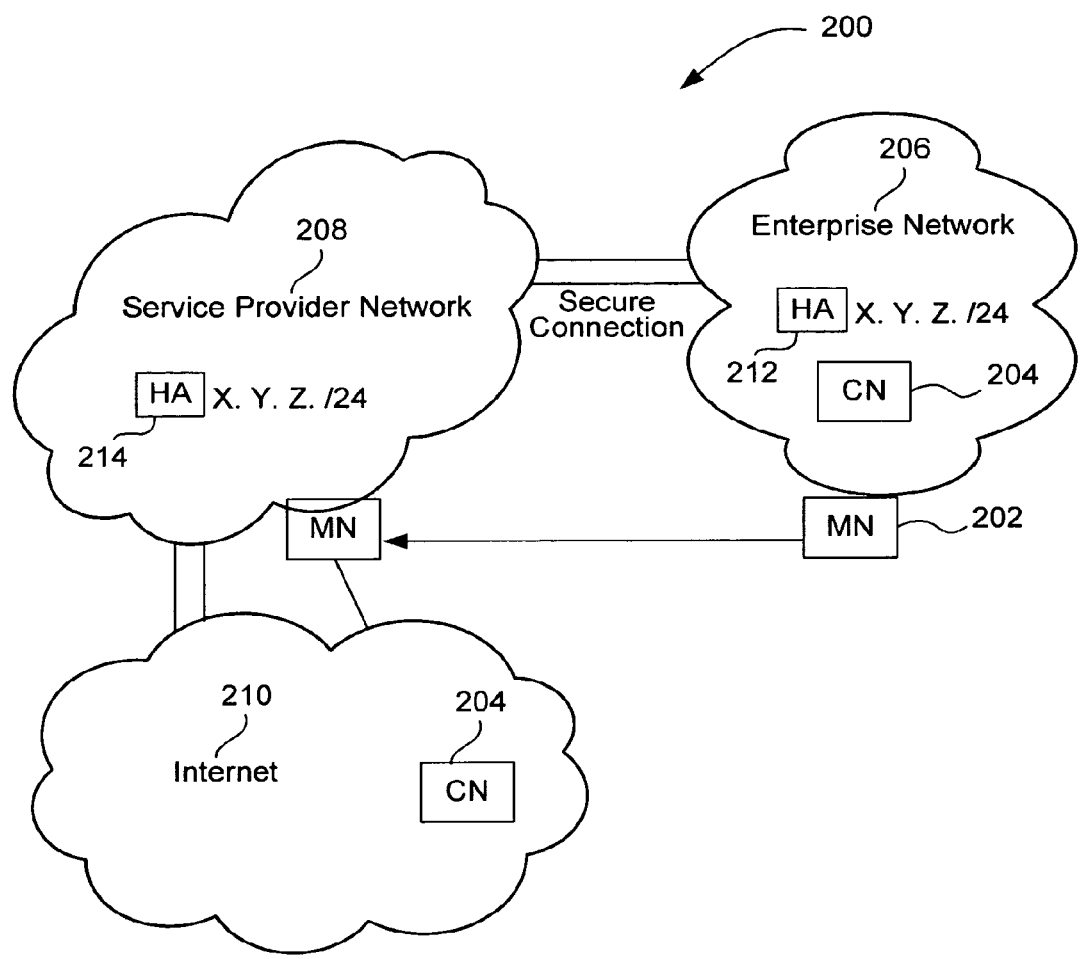
FIG. 2A is a diagram illustrating an exemplary system in which the present invention may be implemented.

FIG. 2A is a diagram illustrating an exemplary system 202 in which the present invention may be implemented. The system 202 enables a Mobile Node 202 to maintain connectivity during a Mobile IP session with a Correspondent Node 204 as the Mobile Node 202 roams among an enterprise network 206 (e.g., the Mobile Node's home network), a Service Provider network 208, and the Internet 210. This is true regardless of the location of the Correspondent Node. In other words, the Correspondent Node may also roam among the Service Provider network 208 and the Internet 210, as well as its enterprise network. This is accomplished via a Home Agent 212 in the enterprise network 206 and a counterpart Home Agent 214 in the Service Provider network 208.

The home network is advertised by the enterprise Home Agent within the enterprise network. This information may or may not be propagated to the Internet. Similarly, the Service Provider network 208 advertises reachability to the Enterprise's home network. For instance, the counterpart Home Agent in the Service network 208 may advertise reachability to the Enterprise's home network on the virtual LAN. The counterpart Home Agent also maintains a corresponding routing table.

In accordance with one embodiment, routing protocols are used to distribute routing information. More particularly, a routing protocol such as Interior Gateway Protocol (IGP) is used to distribute routing information in the enterprise network 206. A routing protocol such as IGP or Exterior Gateway Protocol (EGP), is used to distribute routing information in the Service Provider network 208.

In accordance with one embodiment, a set of two or more Home Agents is associated with one another. For instance, the set of Home Agents may be associated with a single enterprise network. The set of Home Agents may be associated with one another via a logical address. In addition, each of the set of Home Agents also has a unique IP address. In this manner, each enterprise network may have an associated set of Home Agents. For instance, the set of Home Agents may include one or more Home Agents in the enterprise network, as well as one or more Home Agents in one or more Service Provider networks.

Each Mobile Node may also be associated with its home network (e.g., enterprise network). This may be accomplished by configuring the Mobile Node with the logical address. Alternatively, the Mobile Node may retrieve the logical address dynamically (e.g., by requesting this address from its enterprise Home Agent).

Since routing information may be distributed via a routing protocol, routing information for the logical address of a set of Home Agents may be distributed via a routing protocol. Typically, only one path will be visible to the Mobile Node receiving the routing information. Thus, from the routing information distributed via such routing protocols, the Mobile Node may identify the closest Home Agent. From this information, the Mobile Node may compose a registration request including the Home Agent's IP address.

Each Home Agent in the set of Home Agents may be implemented as a separate physical entity. Alternatively, each Home Agent in the set of Home Agents may be implemented as a virtual Home Agent. In this manner, multiple virtual Home Agents may be supported by a single network device. This may be accomplished by storing a routing table at the Home Agent for each enterprise network and corresponding virtual Home Agent implemented by the network device. In this manner, each virtual Home Agent in the set of Home Agents has a corresponding routing table associated with the same enterprise network.

In accordance with one embodiment, each enterprise network will have at least one Home Agent implemented within the enterprise network. Moreover, at least one counterpart Home Agent for the enterprise network is implemented in each of one or more Service Provider networks. Thus, a Service Provider may implement a Home Agent for multiple enterprise networks.

In accordance with one embodiment, the Service Provider includes a Home Agent that hosts multiple enterprise Home Agents. This may be accomplished via Virtual Route Forwarding (VRF). More particularly, a VRF table may store routing data for each Virtual Private Network.

For each Mobile Node and corresponding Mobile IP session, one of the set of Home Agents will act as a serving (i.e., primary) Home Agent, while the remaining Home Agent(s) (e.g., associated with the enterprise) will act as a secondary Home Agent. Thus, the serving Home Agent may either be in the enterprise network or in a Service Provider network. Similarly, the secondary Home Agent(s) may either be in a Service Provider network or in an enterprise network. The serving Home Agent is responsible for forwarding packets to the Mobile Node, while the secondary Home Agent(s) forwards data packets to the serving Home Agent. The secondary Home Agent(s) are not responsible for directly forwarding packets to the Mobile Node.

Figure 2B:
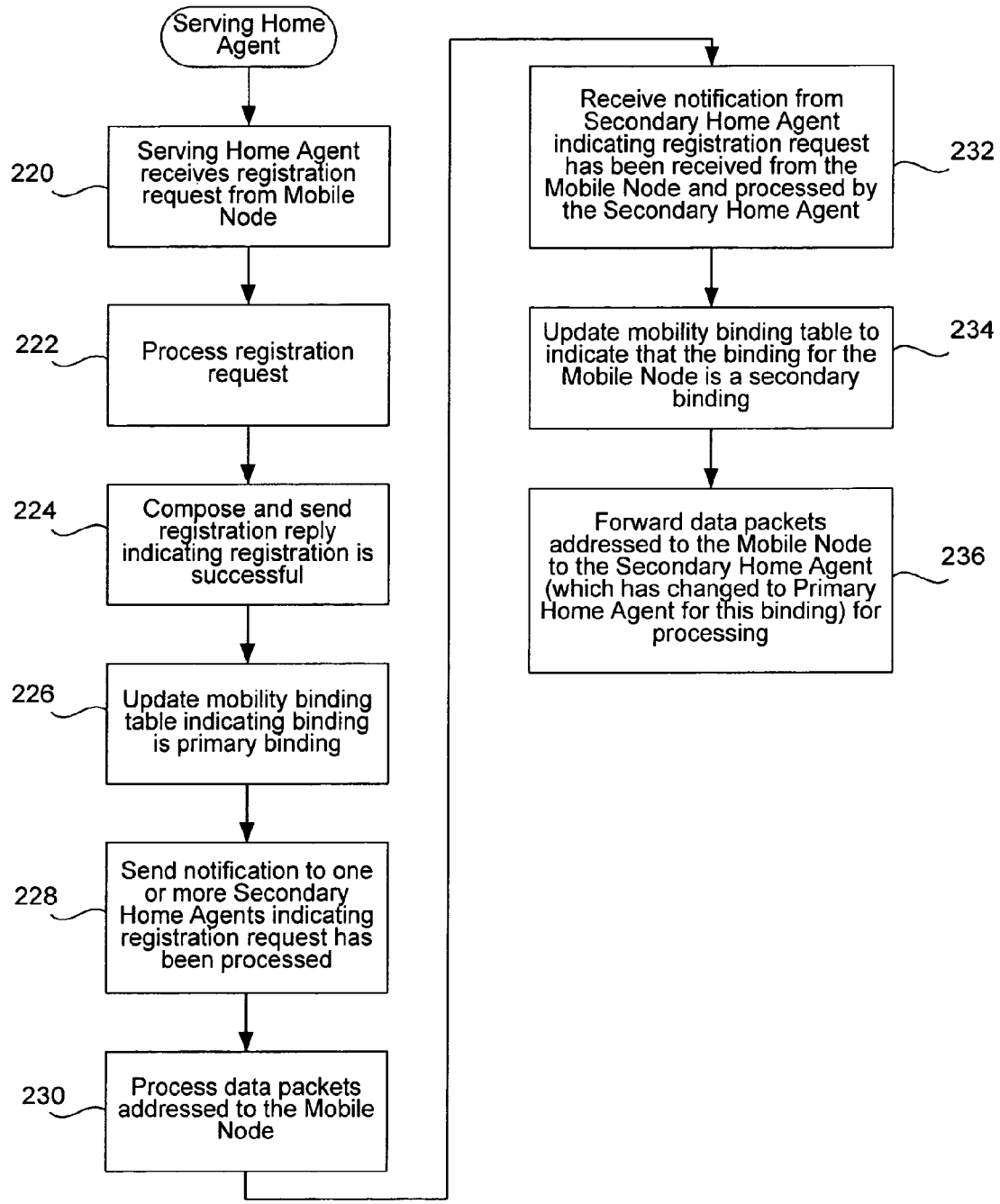
FIG. 2B is a process flow diagram illustrating a method of implementing a Serving Home Agent in accordance with one embodiment of the invention.

FIG. 2B is a process flow diagram illustrating a method of implementing a serving Home Agent in accordance with one embodiment of the invention. A serving Home Agent receives a registration request including a care-of address from a Mobile Node at 220. In accordance with one embodiment, the primary Home Agent may ascertain that the registration request is directed to it since the Home Agent address of the registration request identifies the IP address of the primary Home Agent. Alternatively, the serving Home Agent may ensure that it is to act as the serving Home Agent for the Mobile Node by checking the registration request for an indication that the Home Agent is not to act as the serving Home Agent. More particularly, the registration request may indicate that the Home Agent is to act as the serving Home Agent when the registration request is in a first state, and may indicate that the Home Agent is to act as a secondary Home Agent when the registration request is in a second state. For instance, the Home Agent may check for the presence of an extension indicating that the Home Agent is to act as a secondary Home Agent rather than a serving Home Agent. Once the serving Home Agent has ensured that it is the serving Home Agent, it processes the registration request at 222 to authenticate the Mobile Node. Authentication may be performed by the Home Agent directly or indirectly (e.g., via a separate server, such as a AAA server).

When authentication is successful, the serving Home Agent composes and sends a registration reply to the Mobile Node indicating that registration is successful at 224. In addition, a mobility binding table is updated at 226 to include a binding for the Mobile Node such that the Mobile Node is associated with its care-of address. In addition, the binding may indicate that the Home Agent is acting as a serving Home Agent for the Mobile Node. This binding may be referred to as a "primary binding."

All secondary Home Agents for the enterprise network are notified of the registration. In this example, it is assumed that a single secondary Home Agent is implemented. Thus, a notification is sent to a second Home Agent in the set of Home Agents at 228 indicating that the registration request has been received and processed by the serving Home Agent such that the Mobile Node is registered with the serving Home Agent. In addition, the notification indicates that data packets received by the secondary Home Agent that are addressed to the Mobile Node are to be forwarded to the serving Home Agent.

The notification may be the registration request. For instance, the serving Home Agent may append an extension to the registration request, where the extension indicates that the registration request has been received and processed by the serving Home Agent such that the Mobile Node is registered with the first Home Agent. Alternatively, the notification may be sent as a message separate from the registration request.

The serving Home Agent may thereafter process and forward data packets addressed to the Mobile Node to the Mobile Node at 230. Of course, the serving Home Agent is only the serving Home Agent until the Mobile Node registers with another Home Agent. For instance, the Mobile Node may register directly with a secondary Home Agent. In this case, the secondary Home Agent becomes the serving Home Agent, and the previous serving Home Agent becomes a secondary Home Agent.

When the Mobile Node has registered with a secondary Home Agent, the serving Home Agent receives a notification from the secondary Home Agent indicating that a second registration request sent by the Mobile Node has been received and processed by the secondary Home Agent such that the Mobile Node is registered with the secondary Home Agent as shown at 232. The notification may be the second registration request, which may include an extension as set forth above. The serving Home Agent also updates its mobility binding table such that the binding indicates that the serving Home Agent is now a secondary Home Agent for the binding at 234. Stated another way, the binding for the Mobile Node is now a secondary binding. Thus, data packets addressed to the Mobile Node that are received by the prior serving Home Agent are to be forwarded to the prior secondary Home Agent. In other words, the prior serving Home Agent is now a secondary Home Agent, and the prior secondary Home Agent is now the serving Home Agent. Upon receiving data packets addressed to the Mobile Node, the data packets are forwarded to the current serving Home Agent (previously the secondary Home Agent) for processing, as shown at 236. In this manner, a Home Agent acting as a serving Home Agent for a particular Mobile Node may be transformed into a secondary Home Agent (and vice versa).

Figure 2C:
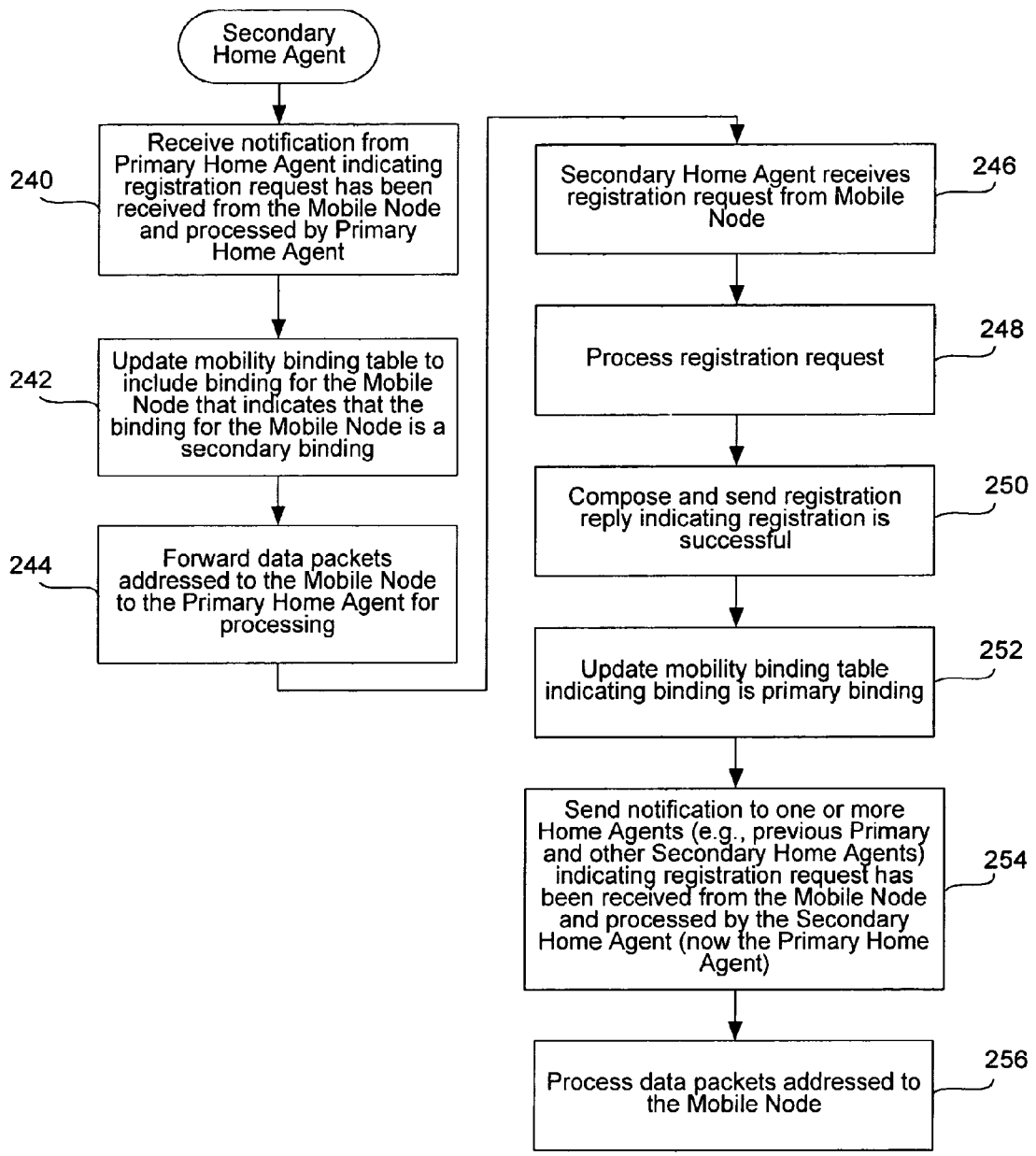
FIG. 2C is a process flow diagram illustrating a method of implementing a Secondary Home Agent in accordance with one embodiment of the invention.

FIG. 2C is a process flow diagram illustrating a method of implementing a Secondary Home Agent in accordance with one embodiment of the invention. As set forth above, when a primary Home Agent sends a notification indicating that a registration request has been received and processed by the serving Home Agent such that a Mobile Node is registered with the serving Home Agent, the secondary Home Agent receives the notification (e.g., registration request) at 240. Once the secondary Home Agent confirms (e.g., via the extension to the registration request) that it is acting as the secondary Home Agent for the Mobile Node, it may update its mobility binding table accordingly at 242.

In accordance with one embodiment, each of the set of Home Agents maintains a corresponding binding for the Mobile IP session. Thus, in addition to the serving Home Agent maintaining a binding, the secondary Home Agent(s) also maintains a binding for the session. For instance, the secondary Home Agent may update its mobility binding table such that a binding for the Mobile Node indicates that data packets addressed to the Mobile Node that are received by the secondary Home Agent are to be forwarded to the primary Home Agent. The secondary Home Agent now also has the information it needs to function as the serving Home Agent at a later time, if the Mobile Node registers with it at a later time.

When data packets addressed to the Mobile Node are received by the secondary Home Agent, it forwards the data packets to the serving Home Agent at 244. However, when the Mobile Node registers with the secondary Home Agent, it subsequently becomes the new serving Home Agent. More particularly, the secondary Home Agent receives the registration request identifying a care-of address of the Mobile Node at 246. In accordance with one embodiment, the secondary Home Agent may ascertain that the registration request is directed to it since the Home Agent address of the registration request identifies the IP address of the secondary Home Agent. The secondary Home Agent processes the registration request to authenticate the Mobile Node at 248.

The secondary Home Agent composes and sends a registration reply to the Mobile Node indicating that registration is successful at 250. The secondary Home Agent updates its mobility binding table to indicate that the binding is a primary binding at 252. In other words, it updates the binding for the Mobile Node such that the binding indicates that data packets addressed to the Mobile Node that are received by the secondary Home Agent are to be processed by the secondary Home Agent (which is now the serving Home Agent).

The secondary Home Agent also sends a notification to the serving Home Agent indicating that the second registration request sent by the Mobile Node has been received and processed by the secondary Home Agent such that the Mobile Node is registered with the secondary Home Agent at 254. As set forth above, the notification indicates that data packets that are addressed to the Mobile Node are to be forwarded to the secondary Home Agent (now the serving Home Agent). The notification may include the second registration request, which may include an extension as set forth above. The prior serving Home Agent now acts as the secondary Home Agent. Thus, the mobility binding table is updated accordingly to include the new information (e.g., care-of address) and change in status to secondary binding.

The secondary Home Agent now acts as a serving Home Agent, while the prior serving Home Agent now acts as secondary Home Agent. Thus, the secondary Home Agent (now the current serving Home Agent) processes data packets addressed to the Mobile Node accordingly at 256.

In accordance with one embodiment, when the Mobile Node is in its enterprise network, registration requests are routed to a Home Agent in the enterprise network. Similarly, when the Mobile Node is in the Service Provider's network, registration requests are routed to the Service Provider's Home Agent for the corresponding enterprise network.

Data packets transmitted to the Mobile Node are processed by the serving Home Agent. Any data packets received by the secondary Home Agent are tunneled to the serving Home Agent. The serving Home Agent then tunnels the data packets to the Mobile Node.

Data packets transmitted by the Mobile Node to a Correspondent Node are typically sent to the Mobile Node's Home Agent in its enterprise network. However, in accordance with various embodiments of the invention, data packets may be transmitted to either the Mobile Node's Home Agent in its enterprise network, or its counterpart in the Service Provider network.

Data packets transmitted by the Mobile Node may be routed in a variety of ways, depending upon the destination address of the data packets. In accordance with one embodiment, data traffic transmitted to a Correspondent Node in the Service Provider network are routed to the Service Provider's Home Agent by the Enterprise network's Home Agent. (Where the Mobile Node is in the Service Provider network, data traffic transmitted is routed locally by the Service Provider's Home Agent.) In accordance with another embodiment, traffic sent by the Mobile Node to a Correspondent Node in an enterprise network is routed to the Enterprise network's Home Agent by the Service Provider's Home Agent. (Where the Mobile Node is in the same enterprise network as the Correspondent Node, data traffic is routed locally by the Enterprise Home Agent.)

Data packets transmitted over the Internet need to be processed by a Network Address Translation (NAT) module. More particularly, data packets for a particular data flow need to be transmitted via the same NAT module as those previously transmitted. More particularly, the Home Agent may be located in either the Service Provider network or the enterprise network.

In order to simplify the decision-making process, data packets transmitted by the Mobile Node over the Internet may be automatically transmitted in the same manner. In accordance with a first embodiment, Internet traffic transmitted by the Mobile Node is automatically forwarded to a Home Agent at the Service Provider network, where NAT is performed, as will be described in further detail below with reference to FIGS. 3-4B. In accordance with a second embodiment, Internet traffic transmitted by the Mobile Node is automatically forwarded to a Home Agent in the enterprise network, as will be described in further detail below with reference to FIGS. 5-6B. A more intelligent approach will be described in further detail below with reference to FIGS. 7-9.

Figure 3:
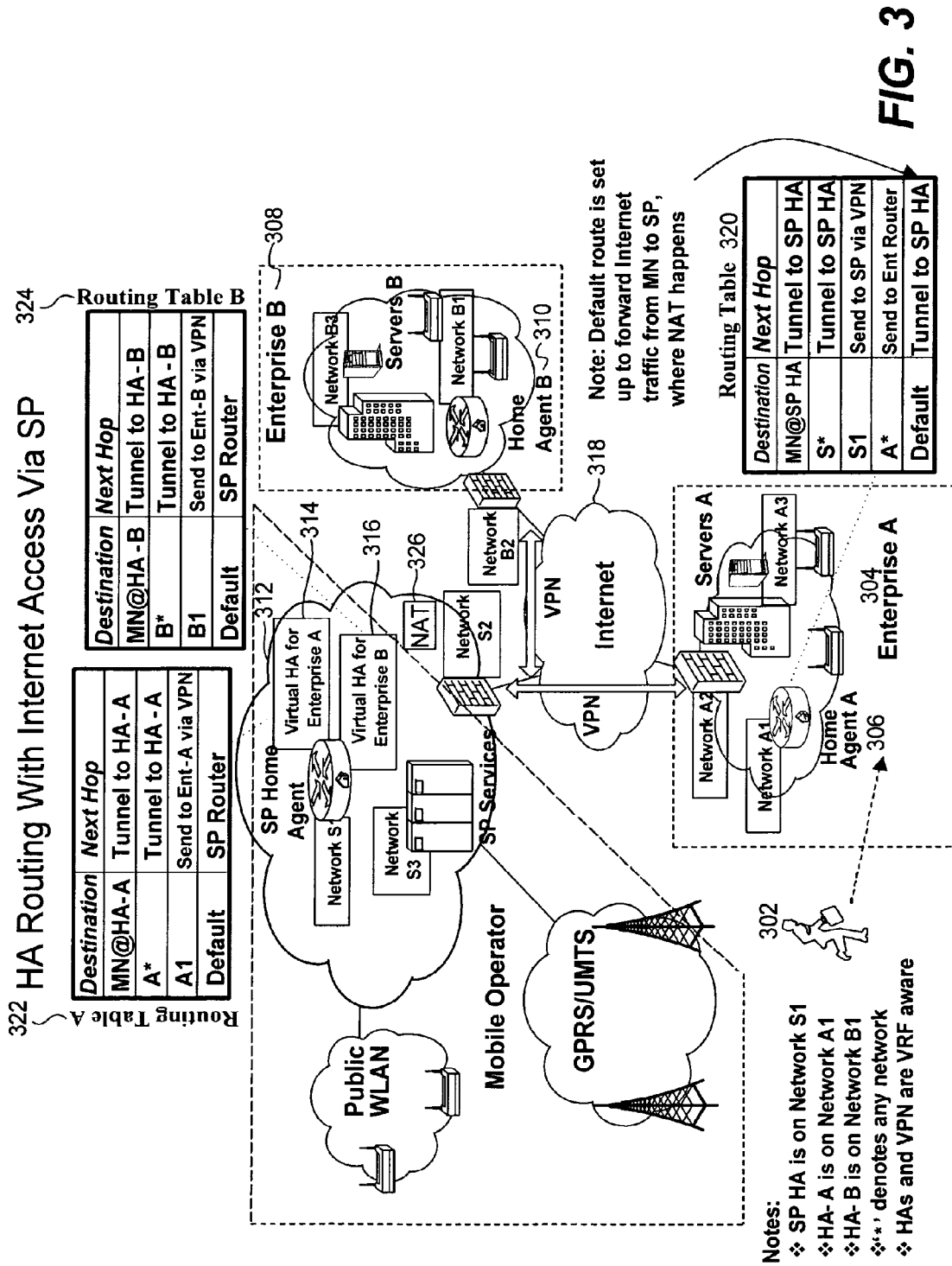
FIG. 3 is a diagram illustrating an exemplary system in which the present invention may be implemented in which Internet Access is provided via the Service Provider.

FIG. 3 is a diagram illustrating an exemplary system in which the present invention may be implemented in which Internet Access is provided via the Service Provider. As shown in this example, a Mobile Node 302 having its home network at Enterprise Network A 304 may register with its Home Agent 306 within Enterprise Network A 304 when the Mobile Node 302 is within the Enterprise Network A 304. Other enterprise networks such as Enterprise Network B 308 may include a corresponding Home Agent, shown here as Home Agent B 310.

A Service Provider Network 312 includes a virtual Home Agent for each enterprise network for which it supports mobility. Thus, in this example, the Service Provider Network 312 includes a virtual Home Agent for Enterprise Network A 314 and a virtual Home Agent for Enterprise Network B 316. When the Mobile Node 302 is within the Service Provider Network 312, it may register with the virtual Home Agent for Enterprise Network A 314. Communication among the Service Provider Network 312 and the enterprise networks, Enterprise Network A 304 and Enterprise Network B 308, may be accomplished via the Internet 318. More particularly, a Virtual Private Network (VPN) tunnel may support communication between the Service Provider Network 312 and each of the Enterprise Networks 304, 308.

Each Home Agent has a routing table. As shown at 320, Home Agent A has a routing table 320, which may be associated with the enterprise network, Enterprise Network A 304. Similarly, the Service Provider network 312 has a routing table for each enterprise network. For instance, each virtual Home Agent may maintain a routing table for its enterprise network. In this example, the virtual Home Agent for Enterprise Network A 314 has an associated routing table 322, while the virtual Home Agent for Enterprise Network B 316 has an associated routing table 324. These routing tables direct packets to the next hop router for packets addressed to the specified destination, as shown. As shown at 326, Network Address Translation (NAT) is performed by the Service Provider network. Therefore, the default route is set up to forward traffic from the Mobile Node to the Service Provider, where NAT is performed.

FIG. 4A is a diagram illustrating the flow of data packets in a system such as that illustrated in FIG. 3 when a Mobile Node roams from the Service Provider network to the Enterprise network in accordance with one embodiment of the invention. Data flow between the Mobile Node and the Correspondent Node (CN) when the CN is in Enterprise A is represented at 402. As shown at 403, when the Mobile Node is in the Service Provider network, traffic may be sent to and from the Mobile Node, as shown. Specifically, as shown at 404, since the Mobile Node is in the Service Provider network, data packets are transmitted (e.g., tunneled) from the Mobile Node to the Correspondent Node via the Mobile Node's Home Agent in the Service Provider network. As shown in the Service Provider routing table 322, data packets addressed to Network A are tunneled to the Home Agent in the enterprise network. The data packets are therefore tunneled to the Mobile Node's Home Agent in the enterprise network via the Virtual Private Network (VPN). The Mobile Node's Home Agent in the enterprise network then forwards the data packets to the Correspondent Node.

Similarly, as shown at 406, since the Correspondent Node is in Enterprise network A, data packets are transmitted (e.g., tunneled) from the Correspondent Node to the Mobile Node via the Mobile Node's Home Agent in the enterprise network. However, since the Mobile Node is in the Service Provider network, this Home Agent is the Mobile Node's secondary Home Agent. Thus, the data packets are tunneled to the Mobile Node's Home Agent in the Service Provider network via the Virtual Private Network (VPN), as specified by the Home Agent's routing table. The Mobile Node's Home Agent in the Service Provider network then forwards the data packets to the Mobile Node, as the Mobile Node's serving Home Agent.

The Mobile Node then roams to Enterprise network A as shown at 407. When the Correspondent Node and the Mobile Node are both in Enterprise A, traffic may be sent to and from the Mobile Node, as shown. Specifically, since both the Mobile Node and the Correspondent Node are both in the enterprise network, data packets are transmitted from the Mobile Node to the Correspondent Node (as shown at 408) and vice versa (as shown at 410) via the Mobile Node's Home Agent in the enterprise network.

Data flow between the Mobile Node and the CN when the CN is in the Service Provider network is represented at 412. As shown at 413, when both the CN and the Mobile Node are in the Service Provider network, the CN and Mobile Node are registered with their corresponding Home Agent in the Service Provider network. Thus, traffic may be sent to and from the Mobile Node, as shown. Specifically, as shown at 414 and 416, data packets are transmitted from the Mobile Node to the Correspondent Node and vice versa via the Mobile Node's Home Agent in the Service Provider network, as specified in the default entries in the Service Provider Home Agent routing tables.

The Mobile Node then roams to Enterprise network A at 417. Since the Mobile Node is in Enterprise network A, data packets are transmitted from the Mobile Node to the Correspondent Node as shown at 418 via the Mobile Node's Home Agent in the enterprise network. The data packets are transmitted to the Mobile Node's Home Agent in the Service Provider network via the Virtual Private Network (VPN), as specified in the Home Agent's routing table. The Mobile Node's Home Agent in the Service Provider network then forwards the data packets to the Correspondent Node.

Similarly, as shown at 420, when the Correspondent Node is in the Service Provider network, data packets are transmitted from the Correspondent Node to the Mobile Node via the Mobile Node's Home Agent in the Service Provider network. Since the Home Agent in the Service Provider network is no longer the serving Home Agent for the Mobile Node, the data packets are then transmitted to the Mobile Node's Home Agent in the enterprise network via the Virtual Private Network (VPN), as specified in the Service Provider Home Agent's routing table. The Home Agent in the enterprise network, which is now acting as the serving Home Agent, then forwards the data packets to the Mobile Node.

Data flow between the Mobile Node and the Correspondent Node (CN) when the CN is in Enterprise B is represented at 422. As shown at 423, when the Mobile Node is in the Service Provider network, traffic may be sent to and from the Mobile Node, as shown. Specifically, as shown at 424, Internet traffic sent by the Mobile Node is routed to the Home Agent where NAT is performed. Thus, data packets are transmitted (e.g., tunneled) from the Mobile Node to the Correspondent Node via the (Correspondent Node's) Home Agent in the Service Provider network for Enterprise Network B (where NAT is performed). The data packets are then processed by a Network Address Translation (NAT) module in the Service Provider network and transmitted to the Correspondent Node.

Similarly, as shown at 426, when the Correspondent Node sends data packets to the Mobile Node, Internet traffic is routed to the Service Provider network, where NAT is performed. The data packets are translated by the NAT module in the Service Provider network and forwarded to the Home Agent in the Service Provider network (with which the Mobile Node has registered). The Home Agent then tunnels the data packets to the Mobile Node.

The Mobile Node then roams to Enterprise network A at 427. Thus, the Mobile Node is in Enterprise network A and the CN is in Enterprise network B. As shown at 428, when the Mobile Node sends data packets to the CN, the data packets are transmitted via the Mobile Node's Home Agent in Enterprise network A. According to the default entry in the routing table, the data packets are then tunneled to the Home Agent in the Service Provider network (e.g., via the VPN), where NAT is performed. The data packets are then processed by a NAT module in the Service Provider network and forwarded to the CN.

Similarly, as shown at 430, the Mobile Node is located in the Enterprise network. The Correspondent Node sends data packets to the Mobile Node. The data packets are sent to and translated by a NAT module in the Service Provider network. The data packets are then forwarded to the Mobile Node's Home Agent in the Service Provider network. Since the Mobile Node has roamed to Enterprise Network A and the Service Provider Home Agent is a secondary Home Agent for the Mobile Node, the Service Provider Home Agent tunnels the data packets to the Home Agent in Enterprise network A via the VPN. The Home Agent in Enterprise network A then forwards the data packets to the Mobile Node, as the serving Home Agent.

FIG. 4B is a diagram illustrating the flow of data packets in a system such as that illustrated in FIG. 3 when a Mobile Node roams from the Enterprise network to the Service Provider network in accordance with one embodiment of the invention. Data flow between the Mobile Node and the CN when the CN is in Enterprise network A is represented at 432. As shown at 433, when the Mobile Node is in the same Enterprise network, traffic may be sent to and from the Mobile Node, as shown. Specifically, as shown at 434 and 436, since both the CN and MN are registered with the Home Agent in the enterprise network, data packets are transmitted from the Mobile Node to the CN and vice versa via the Home Agent in the enterprise network.

The Mobile Node then roams to the Service Provider network. As shown at 437, when the Mobile Node is in the Service Provider network, traffic may be sent to and from the Mobile Node, as shown. Specifically, as shown at 438, since the Mobile Node is in the Service Provider network, data packets are transmitted (e.g., tunneled) from the Mobile Node to the Correspondent Node via the Mobile Node's Home Agent in the Service Provider network. The data packets are transmitted (e.g., tunneled) to the Mobile Node's Home Agent in the enterprise network via the Virtual Private Network (VPN), as specified in the Service Provider Home Agent's routing table. The Home Agent in the enterprise network then forwards the data packets to the Correspondent Node.

Similarly, as shown at 440, the data packets sent by the Correspondent Node to the Mobile Node are sent to the Mobile Node's Home Agent in the enterprise network. As specified in the routing table of the Home Agent in the enterprise network, the data packets are then tunneled to the Home Agent in the Service Provider network via the Virtual Private Network (VPN). In other words, the secondary Home Agent for the Mobile Node forwards the data packets to the Mobile Node's serving Home Agent. The Home Agent in the Service Provider network then forwards the data packets to the Mobile Node, as the Mobile Node's serving Home Agent.

Data flow between the Mobile Node and the CN when the CN is in the Service Provider network is represented at 442. As shown at 443, when the Mobile Node is in the enterprise network, traffic may be sent to and from the Mobile Node, as shown. Since the Mobile Node is in the enterprise network, data packets are transmitted from the Mobile Node to the Correspondent Node as shown at 444 via the Mobile Node's Home Agent in the enterprise network. The data packets are therefore transmitted to the Mobile Node's Home Agent in the Service Provider network via the Virtual Private Network (VPN), as specified in the routing table of the Home Agent in the enterprise network. The Home Agent in the Service Provider network then forwards the data packets to the Correspondent Node.

Similarly, as shown at 446, since the Correspondent Node is located in the Service Provider network, data packets are transmitted from the Correspondent Node to the Mobile Node via the Mobile Node's Home Agent in the Service Provider network. Since the Home Agent is not the serving Home Agent for the Mobile Node, the data packets are transmitted to the Mobile Node's Home Agent in the enterprise network via the Virtual Private Network (VPN), as specified in the Home Agent's routing table. The Home Agent in the enterprise network then forwards the data packets to the Mobile Node, as the Mobile Node's serving Home Agent.

As shown at 447, when the Mobile Node roams to the Service Provider network, traffic may be sent to and from the Mobile Node, as shown. Specifically, as shown at 448 and 450, since both the Mobile Node and CN are in the Service Provider network, data packets are transmitted from the Mobile Node to the Correspondent Node and vice versa via the addressee's Home Agent in the Service Provider network.

Data flow between the Mobile Node and the Correspondent Node (CN) when the CN is in Enterprise B is represented at 452. The Mobile Node is located in Enterprise network A at 453. Thus, the Mobile Node is in Enterprise network A and the CN is in Enterprise network B. As shown at 454, when the Mobile Node sends data packets to the CN, the data packets are transmitted via a Home Agent in Enterprise network A (with which the Mobile Node has registered). As set forth in the default entry in the routing table, the data packets are then sent to an enterprise router. The default route is set up to forward Internet traffic from the Mobile Node to the Service Provider network, where NAT is performed. The data packets are then transmitted to the Mobile Node's Home Agent in the Service Provider network via the VPN. The data packets are then processed by a NAT module in the Service Provider network and forwarded to the CN.

Similarly, as shown at 456, when the CN sends data packets to the Mobile Node, the data packets are translated by a NAT module in the Service Provider network, since all NAT processing is performed in the Service Provider network. The data packets are then forwarded to the Mobile Node's Home Agent in the Service Provider network. However, the Service Provider Home Agent acts as the Mobile Node's secondary Home Agent. Thus, the secondary Home Agent tunnels the data packets to the Mobile Node's Home Agent in Enterprise network A via the VPN, as set forth in the secondary Home Agent's routing table. The Home Agent in Enterprise network A then forwards the data packets to the Mobile Node as the Mobile Node's serving Home Agent.

As shown at 457, when the Mobile Node is in the Service Provider network, traffic may be sent to and from the Mobile Node, as shown. Specifically, as shown at 458, since the Mobile Node is in the Service Provider network, data packets are transmitted (e.g., tunneled) from the Mobile Node to the Correspondent Node via the Mobile Node's Home Agent in the Service Provider network. In other words, the default route is set up to forward Internet traffic from the Mobile Node to the Service Provider, where NAT is performed. The data packets are therefore transmitted to and processed by a NAT module in the Service Provider network and transmitted to the Correspondent Node.

Similarly, as shown at 460, when the Correspondent Node sends data packets to the Mobile Node, the data packets are translated by the NAT module in the Service Provider network and forwarded to the Mobile node's Home Agent in the Service Provider network. The Home Agent then tunnels the data packets to the Mobile Node as the Mobile Node's serving Home Agent.

As set forth above, a default route may be established for transmitting Internet traffic sent by the Mobile Node. In accordance with a second embodiment, Internet traffic transmitted by the Mobile Node is forwarded to the enterprise network where NAT is performed, as will be described in further detail below with reference to FIGS. 5-6B.

Figure 5:
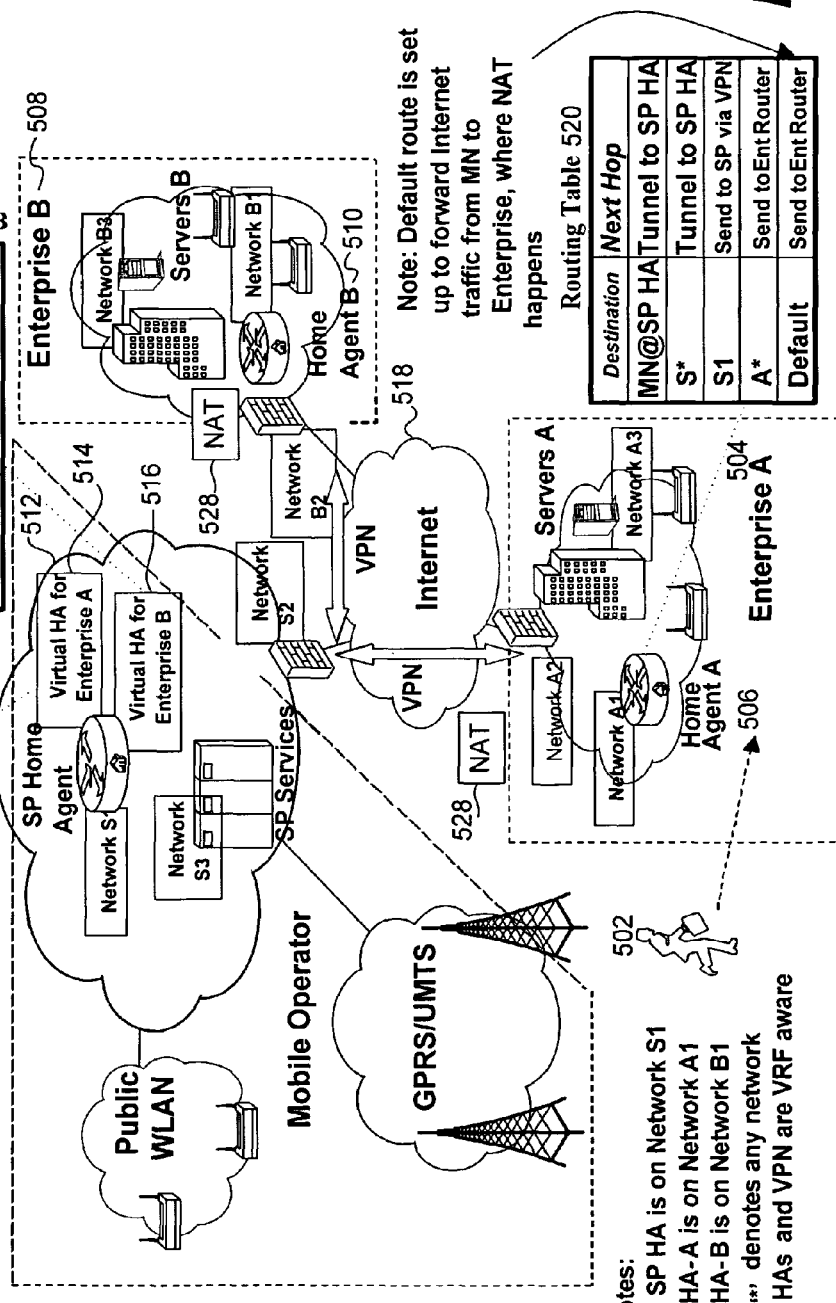
FIG. 5 is a diagram illustrating an exemplary system in which the present invention may be implemented in which Internet Access is provided via the Enterprise network.

FIG. 5 is a diagram illustrating an exemplary system in which the present invention may be implemented in which Internet Access is provided via the Enterprise network. As shown in this example, a Mobile Node 502 having its home network at Enterprise Network A 504 may register with its Home Agent 506 within Enterprise Network A 504 when the Mobile Node is in Enterprise Network A 504. Other enterprise networks such as Enterprise Network B 508 may include a corresponding Home Agent, shown here as Home Agent B 510.

A Service Provider Network 512 includes a virtual Home Agent for each enterprise network. Thus, in this example, the Service Provider Network 512 includes a virtual Home Agent for Enterprise Network A 514 and a virtual Home Agent for Enterprise Network B 516. When the Mobile Node 502 is within the Service Provider Network 512, it may register with the virtual Home Agent for Enterprise Network A 514. Communication among the Service Provider Network 512 and the enterprise networks, Enterprise Network A 504 and Enterprise Network B 508, may be accomplished via the Internet 518. More particularly, a VPN tunnel may support communication between the Service Provider Network 512 and each of the Enterprise Networks 504, 508.

Each Home Agent has a routing table. As shown at 520, Home Agent A has a routing table 520, which may be associated with the enterprise network, Enterprise Network A 504. Similarly, the Service Provider network 512 has a routing table for each enterprise network. For instance, each virtual Home Agent may maintain a routing table for its enterprise network. In this example, the virtual Home Agent for Enterprise Network A 514 has an associated routing table 522, while the virtual Home Agent for Enterprise Network B 516 has an associated routing table 524. These routing tables direct packets to the next hop router for packets addressed to the specified destination, as shown. As shown at 526 and 528, Network Address Translation (NAT) may be performed by the enterprise network. In this particular example, each enterprise network supports NAT translation. However, it is possible that only one enterprise network (e.g., Enterprise Network B) support NAT translation. Therefore, the default route is set up to forward traffic from the Mobile Node to the enterprise network where NAT is performed.

FIG. 6A is a diagram illustrating the flow of data packets in a system such as that illustrated in FIG. 5 when a Mobile Node roams from the Service Provider network to the Enterprise network in accordance with one embodiment of the invention. Data flow between the Mobile Node and the Correspondent Node (CN) when the CN is in Enterprise A is represented at 602. As shown at 603, when the Mobile Node is in the Service Provider network, traffic may be sent to and from the Mobile Node, as shown. Specifically, as shown at 604, data packets are transmitted (e.g., tunneled) from the Mobile Node to the Correspondent Node via the Mobile Node's Home Agent in the Service Provider network. The data packets are tunneled to the Mobile Node's Home Agent in the enterprise network via the Virtual Private Network (VPN), as set forth in the Home Agent's routing table. The Mobile Node's Home Agent in the enterprise network then forwards the data packets to the Correspondent Node.

Similarly, as shown at 606, data packets are transmitted (e.g., tunneled) from the Correspondent Node to the Mobile Node via the Mobile Node's Home Agent in the enterprise network. However, this Home Agent is the secondary Home Agent for the Mobile Node. Thus, the data packets are transmitted to the Mobile Node's Home Agent in the Service Provider network via the Virtual Private Network (VPN), as specified in the Home Agent's routing table. The Home Agent in the Service Provider network then forwards the data packets to the Mobile Node, as the Mobile Node's serving Home Agent.

The Mobile Node then roams to Enterprise network A as shown at 607. When the Correspondent Node and the Mobile Node are both in Enterprise A, traffic may be sent to and from the Mobile Node, as shown. Specifically, since both the Mobile Node and the Correspondent Node are both in the enterprise network, data packets are transmitted from the Mobile Node to the Correspondent Node (as shown at 608) and vice versa (as shown at 610) via the Mobile Node's Home Agent in the enterprise network.

Data flow between the Mobile Node and the CN when the CN is in the Service Provider network is represented at 612. As shown at 613, when the Correspondent Node and the Mobile Node are in the Service Provider network, traffic may be sent to and from the Mobile Node, as shown. Specifically, as shown at 614 and 616, when both the Mobile Node and the Correspondent Node are in the Service Provider network, data packets are transmitted from the Mobile Node to the Correspondent Node and vice versa via the Mobile Node's Home Agent in the Service Provider network.

The Mobile Node then roams to Enterprise network A at 617. Data packets are transmitted from the Mobile Node to the Correspondent Node as shown at 618 via the Home Agent in the enterprise network, with which the Mobile Node has registered. The data packets are then transmitted to the Home Agent in the Service Provider network via the Virtual Private Network (VPN), as set forth in the Home Agent's routing table. The Home Agent in the Service Provider network then forwards the data packets to the Correspondent Node.

Similarly, as shown at 620, the data packets are transmitted from the Correspondent Node to the Mobile Node via the Mobile Node's Home Agent in the Service Provider network. However, this Home Agent is a secondary Home Agent for the Mobile Node. Thus, the data packets are transmitted to the Mobile Node's Home Agent in the enterprise network via the Virtual Private Network (VPN), as set forth in the secondary Home Agent's routing table. The Home Agent in the enterprise network then forwards the data packets to the Mobile Node as the Mobile Node's serving Home Agent.

Data flow between the Mobile Node and the Correspondent Node (CN) when the CN is in Enterprise B is represented at 622. The Mobile Node starts at the Service Provider network at 623. Thus, the Mobile Node is in the Service Provider network and the CN is in Enterprise network B. As shown at 624, when the Mobile Node sends data packets to the CN, the data packets are transmitted via the Mobile Node's Home Agent in the Service Provider network. Since this is the Mobile Node's secondary Home Agent, the data packets are transmitted to the Home Agent in Enterprise network A via the VPN, as set forth in the Home Agent's routing table. The data packets are then processed by a NAT module in the enterprise network (where NAT is performed) and forwarded to the CN.

Similarly, as shown at 626, when the CN sends data packets to the Mobile Node, the data packets are translated by a NAT module in Enterprise network A (where NAT is performed). The data packets are then forwarded to the Mobile Node's Home Agent in the Enterprise Network A. Since this Home Agent is a secondary Home Agent for the Mobile Node, it tunnels the data packets to the Home Agent in the Service Provider network via the VPN, as set forth in the Home Agent's routing table. The Home Agent in the Service Provider network then forwards the data packets to the Mobile Node as the Mobile Node's serving Home Agent.

As shown at 627, when the Mobile Node is in its Enterprise Network A, traffic may be sent to and from the Mobile Node, as shown. As set forth above, Internet traffic sent by the Mobile Node is sent to the enterprise network, where NAT is performed. Specifically, as shown at 628, data packets are transmitted (e.g., tunneled) from the Mobile Node to the Correspondent Node via the Mobile Node's Home Agent in the enterprise network. The data packets are then processed by a Network Address Translation (NAT) module in the enterprise network and transmitted to the Correspondent Node. Similarly, as shown at 630, when the Correspondent Node sends data packets to the Mobile Node, the data packets are translated by the NAT module in Enterprise network A and forwarded to the Home Agent in the Enterprise network A. The Home Agent then tunnels the data packets to the Mobile Node.

FIG. 6B is a diagram illustrating the flow of data packets in a system such as that illustrated in FIG. 5 when a Mobile Node roams from the Enterprise network to the Service Provider network in accordance with one embodiment of the invention. Data flow between the Mobile Node and the CN when the CN is in Enterprise network A is represented at 632. As shown at 633, when the Mobile Node is in the same Enterprise network as the CN, traffic may be sent to and from the Mobile Node, as shown. Specifically, as shown at 634 and 636, data packets are transmitted from the Mobile Node to the Correspondent Node and vice versa via the Mobile Node's Home Agent in the enterprise network.

The Mobile Node then roams to the Service Provider network. As shown at 637, when the Mobile Node is in the Service Provider network, traffic may be sent to and from the Mobile Node, as shown. Specifically, as shown at 638, data packets are transmitted (e.g., tunneled) from the Mobile Node to the Correspondent Node via the Mobile Node's Home Agent in the Service Provider network. The data packets are tunneled to the Home Agent in the enterprise network via the Virtual Private Network (VPN), as set forth in the Home Agent's routing table. The Home Agent in the enterprise network then forwards the data packets to the Correspondent Node.

Similarly, as shown at 640, data packets are transmitted from the Correspondent Node to the Mobile Node via the Mobile Node's Home Agent (e.g., Enterprise A) in the enterprise network. Since this Home Agent is the secondary Home Agent for the Mobile Node, the data packets are tunneled to the Home Agent in the Service Provider network via the Virtual Private Network (VPN), as set forth in the Home Agent's routing table. The Home Agent in the Service Provider network then forwards the data packets to the Mobile Node as the Mobile Node's serving Home Agent.

Data flow between the Mobile Node and the CN when the CN is in the Mobile Operator (i.e., Service Provider) network is represented at 642. As shown at 643, when the Mobile Node is in the enterprise network, traffic may be sent to and from the Mobile Node, as shown. Data packets are transmitted from the Mobile Node to the Correspondent Node as shown at 644 via the Mobile Node's Home Agent in the enterprise network (B). The data packets are transmitted to the Home Agent in the Service Provider network via the Virtual Private Network (VPN), as set forth in the Home Agent's routing table. The Home Agent in the Service Provider network then forwards the data packets to the Correspondent Node.

Similarly, as shown at 646, since the Correspondent Node is in the Service Provider network, data packets are transmitted from the Correspondent Node to the Mobile Node via the Mobile Node's Home Agent in the Service Provider network. Since this is the Mobile Node's secondary Home Agent, the data packets are tunneled to the Mobile Node's Home Agent in the enterprise network via the Virtual Private Network (VPN), as specified in the Home Agent's routing table. The Home Agent in the enterprise network then forwards the data packets to the Mobile Node as the Mobile Node's serving Home Agent.

As shown at 647, when the Mobile Node roams to the Service Provider network, both the CN and Mobile Node are in the Service Provider network. Thus, traffic may be sent to and from the Mobile Node, as shown. Specifically, as shown at 648 and 650, data packets are transmitted from the Mobile Node to the Correspondent Node and vice versa via the Mobile Node's Home Agent in the Service Provider network.

Data flow between the Mobile Node and the Correspondent Node (CN) when the CN is in Enterprise B is represented at 652. As shown at 653, when the Mobile Node is in Enterprise network A, traffic may be sent to and from the Mobile Node, as shown. As set forth above, in accordance with one embodiment, the default route is set up to forward Internet traffic from the Mobile Node to the Enterprise network where NAT is performed. In this example, NAT is performed at Enterprise A. Therefore, as shown at 654, data packets are transmitted to the Home Agent in Enterprise A, where NAT is performed prior to forwarding the data packets to the Correspondent Node.

As shown at 656, when the Correspondent Node sends data packets to the Mobile Node, the data packets are translated by the NAT module in Enterprise network A and forwarded to the Home Agent in Enterprise network A, where the Mobile Node is located. The Home Agent then tunnels the data packets to the Mobile Node.

As shown at 657, when the Mobile Node is in the Service Provider network, traffic may be sent to and from the Mobile Node, as shown. Specifically, as shown at 658, data packets are transmitted (e.g., tunneled) from the Mobile Node to the Correspondent Node via the Mobile Node's Home Agent in the Service Provider network. The data packets are tunneled to the Mobile Node's Home Agent in the enterprise network via the VPN. The data packets are then sent to and processed by a Network Address Translation (NAT) module in the enterprise network and transmitted to the Correspondent Node. Similarly, as shown at 660, when the Correspondent Node sends data packets to the Mobile Node, the data packets are sent to and translated by the NAT module in the enterprise network. The data packets are then forwarded to the Mobile Node's Home Agent in the Service Provider network via the Mobile Node's Home Agent in the enterprise network. The Home Agent then tunnels the data packets to the Mobile Node.

While it is possible to anchor Internet traffic as set forth above, automatically transmitting Internet traffic to a particular Home Agent often results in a non-optimal data path. In accordance with a third embodiment, Internet traffic transmitted by the Mobile Node is directed to the same NAT module that handled Internet traffic for the same data flow (e.g., session). This may be accomplished, for example, by tracking the data flow in a table such as a policy routing table, as will be described in further detail below with reference to FIGS. 7-8B. An exemplary policy routing table will be described in further detail below with reference to FIG. 9.

Figure 7:
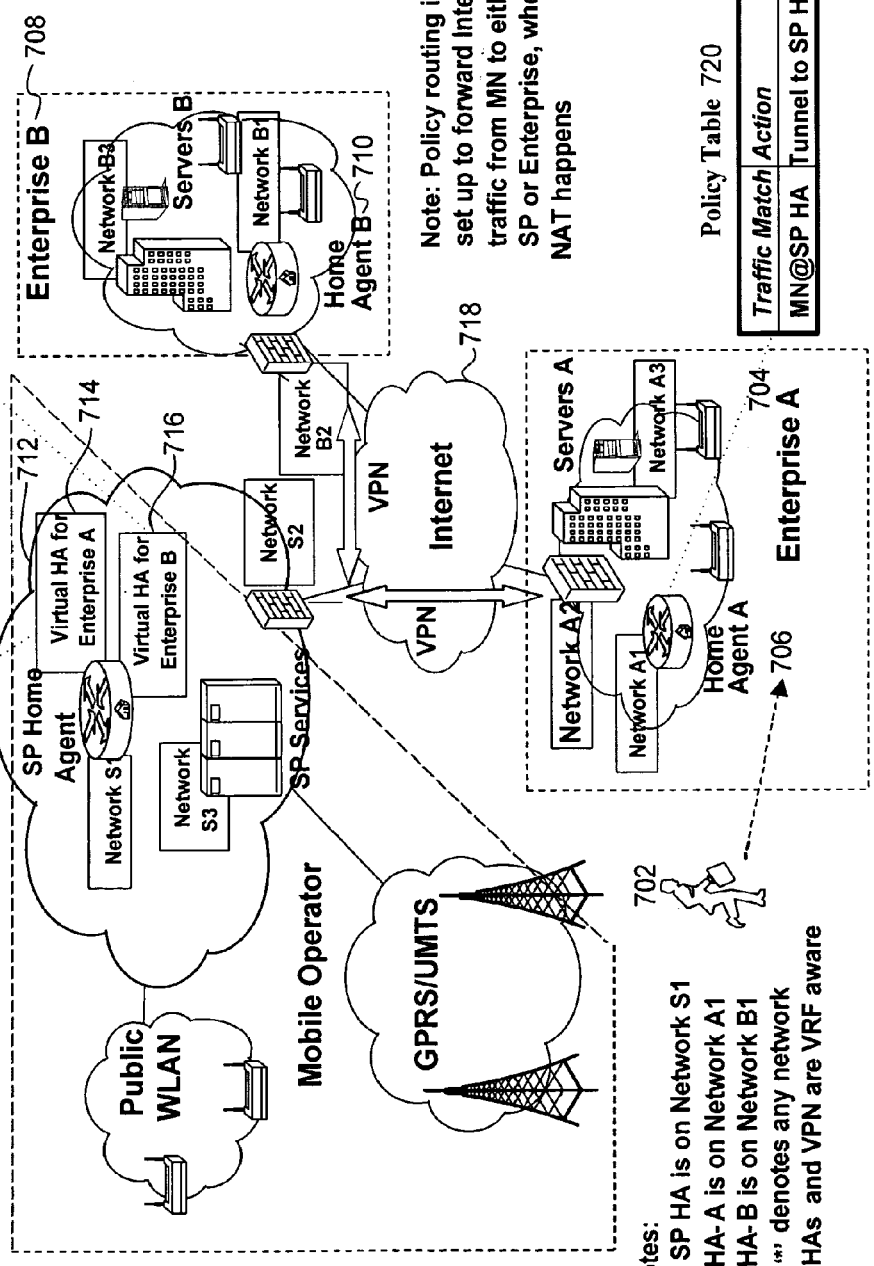
FIG. 7 is a diagram illustrating an exemplary system in which the present invention may be implemented in which Internet Access is provided using a policy table at the Enterprise network.

FIG. 7 is a diagram illustrating an exemplary system in which the present invention may be implemented in which Internet Access is provided using a policy table at the Enterprise network. As shown in this example, a Mobile Node 702 having its home network at Enterprise Network A 704 may register with its Home Agent 706 within Enterprise Network A 704 when the Mobile Node 702 is within the Enterprise Network A 704. Other enterprise networks such as Enterprise Network B 708 may include a corresponding Home Agent, shown here as Home Agent B 710.

A Service Provider Network 712 includes a virtual Home Agent for each enterprise network. Thus, in this example, the Service Provider Network 712 includes a virtual Home Agent for Enterprise Network A 714 and a virtual Home Agent for Enterprise Network B 716. When the Mobile Node 702 is within the Service Provider Network 712, it may register with the virtual Home Agent for Enterprise Network A 714. Communication among the Service Provider Network 712 and the enterprise networks, Enterprise Network A 704 and Enterprise Network B 708, may be accomplished via the Internet 718. More particularly, a VPN tunnel may support communication between the Service Provider Network 712 and each of the Enterprise Networks 704, 708. Network Address Translation (NAT) may be performed by the Service Provider network, as well as the enterprise networks.

Each Home Agent has a routing table. In this particular embodiment, the routing tables function as policy routing tables. The routing tables store information associated with each session and associated data flow in order to redirect traffic for that session to the NAT module that had previously processed the data flow (unless traffic is forwarded locally). As shown at 720, Home Agent A has a routing table 720, which may be associated with the enterprise network, Enterprise Network A 704. Similarly, the Service Provider network 712 has a routing table for each enterprise network. For instance, each virtual Home Agent may maintain a routing table for its enterprise network. In this example, the virtual Home Agent for Enterprise Network A 714 has an associated routing table 722, while the virtual Home Agent for Enterprise Network B 316 has an associated routing table 724. These routing tables direct packets to the specified next hop router for packets associated with the specified data flow, as shown.

FIG. 8A is a diagram illustrating the flow of data packets in a system such as that illustrated in FIG. 7 when a Mobile Node roams from the Service Provider network to the Enterprise network in accordance with one embodiment of the invention. Data flow between the Mobile Node and the Correspondent Node (CN) when the CN is in Enterprise A is represented at 802. As shown at 803, when the Mobile Node is in the Service Provider network, traffic may be sent to and from the Mobile Node, as shown. As set forth above, traffic from the Mobile Node to the enterprise are routed to the enterprise's Home Agent by the Service Provider's Home Agent. Specifically, as shown at 804, data packets are transmitted (e.g., tunneled) from the Mobile Node to the Correspondent Node via the Mobile Node's Home Agent in the Service Provider network. The data packets are then transmitted (e.g., tunneled) to the Home Agent in the enterprise network via the Virtual Private Network (VPN), as specified in the Home Agent's routing table. The Home Agent in the enterprise network then forwards the data packets to the Correspondent Node.

Similarly, as shown at 806, data packets are transmitted (e.g., tunneled) from the Correspondent Node to the Mobile Node via the Home Agent in the enterprise network, since this is the Mobile Node's closest Home Agent to the Correspondent Node. However, this Home Agent is merely a secondary Home Agent. Therefore, the data packets are transmitted to the Home Agent in the Service Provider network via the Virtual Private Network (VPN), as specified in the Home Agent's routing table. The Home Agent in the Service Provider network then forwards the data packets to the Mobile Node, as the serving Home Agent.

The Mobile Node then roams to Enterprise network A as shown at 807. When the Correspondent Node and the Mobile Node are both in Enterprise A, traffic may be sent to and from the Mobile Node, as shown. Specifically, since both the Mobile Node and the Correspondent Node are both in the enterprise network, data packets are transmitted from the Mobile Node to the Correspondent Node (as shown at 808) and vice versa (as shown at 810) via the Home Agent in the enterprise network.

Data flow between the Mobile Node and the CN when the CN is in the Service Provider network is represented at 812. As shown at 813, when both the Correspondent Node and the Mobile Node are in the Service Provider network, traffic may be sent to and from the Mobile Node via the local Home Agent, as shown. Specifically, as shown at 814 and 816, data packets are transmitted from the Mobile Node to the Correspondent Node and vice versa via the Home Agent in the Service Provider network.

The Mobile Node then roams to Enterprise network A at 817. Data packets are transmitted from the Mobile Node to the Correspondent Node as shown at 818 via the Mobile Node's Home Agent in the enterprise network. The data packets are transmitted to the Mobile Node's Home Agent in the Service Provider network via the Virtual Private Network (VPN), as specified in the secondary Home Agent's routing table. The Home Agent in the Service Provider network then forwards the data packets to the Correspondent Node.

Similarly, as shown at 820, data packets are transmitted from the Correspondent Node to the Mobile Node via the Mobile Node's Home Agent in the Service Provider network. However, since the Mobile Node has roamed to its enterprise network, the Home Agent in the Service Provider network is the secondary Home Agent for the Mobile Node. The data packets are therefore transmitted to the Mobile Node's Home Agent in the enterprise network via the Virtual Private Network (VPN), as specified in the Home Agent's routing table. The Home Agent in the enterprise network then forwards the data packets to the Mobile Node, as the Mobile Node's serving Home Agent.

Data flow between the Mobile Node and the Correspondent Node (CN) when the CN is in Enterprise B is represented at 822. As shown at 823, when the Mobile Node is in the Service Provider network, traffic may be sent to and from the Mobile Node, as shown. Specifically, as shown at 824, since the Mobile Node is in the Service Provider network, data packets are transmitted (e.g., tunneled) from the Mobile Node to the Correspondent Node via the Mobile Node's Home Agent in the Service Provider network. The data packets are then processed by a Network Address Translation (NAT) module in the Service Provider network and transmitted to the Correspondent Node.

Similarly, as shown at 826, when the Correspondent Node sends data packets to the Mobile Node, the data packets are translated by the same NAT module that previously translated data packets for that data flow. Thus, the data packets are translated by the NAT module in the Service Provider network and forwarded to the Mobile Node's Home Agent in the Service Provider network. The Home Agent then tunnels the data packets to the Mobile Node, as the serving Home Agent for the Mobile Node.

The Mobile Node roams to Enterprise network A at 827. Thus, the Mobile Node is in Enterprise network A and the CN is in Enterprise network B. As shown at 828, when the Mobile Node sends data packets to the CN, the data packets are transmitted via the Mobile Node's Home Agent in Enterprise network B. The data packets are then transmitted to the Mobile Node's Home Agent in the Service Provider network via the VPN, as specified in the Home Agent's routing table. In other words, the policy routing table ensures that data flows through the same NAT module as that used for the data flow previously. The data packets are then processed by a NAT module in the Service Provider network and forwarded to the CN. Unfortunately, as shown, this data path is far from optimum.

Similarly, as shown at 830, when the CN sends data packets to the Mobile Node, the data packets are translated via the same NAT module as that used for the data flow previously. Thus, the data packets are translated by a NAT module in the Service Provider network. The data packets are then forwarded to the Mobile Node's Home Agent in the Service Provider network. Since the Service Provider Home Agent is the secondary Home Agent for the Mobile Node, the Home Agent tunnels the data packets to the Mobile Node's Home Agent in Enterprise network A via the VPN. The Home Agent in Enterprise network A then forwards the data packets to the Mobile Node.

FIG. 8B is a diagram illustrating the flow of data packets in a system such as that illustrated in FIG. 7 when a Mobile Node roams from the Enterprise network to the Service Provider network in accordance with one embodiment of the invention. Data flow between the Mobile Node and the CN when the CN is in Enterprise network A is represented at 832. As shown at 833, when the Mobile Node is in the same Enterprise network as the CN, traffic may be sent to and from the Mobile Node, as shown. Specifically, as shown at 834 and 836, data packets are transmitted from the Mobile Node to the Correspondent Node and vice versa via the Mobile Node's Home Agent in the enterprise network.

The Mobile Node then roams to the Service Provider network (and registers with its Home Agent in the Service Provider network). As shown at 837, when the Mobile Node is in the Service Provider network, traffic may be sent to and from the Mobile Node, as shown. Specifically, as shown at 838, since the Mobile Node is in the Service Provider network, data packets are transmitted (e.g., tunneled) from the Mobile Node to the Correspondent Node via the Mobile Node's Home Agent in the Service Provider network. Based on the routing table, the data packets are tunneled to the Mobile Node's Home Agent in Enterprise Network A via the Virtual Private Network (VPN). The Mobile Node's Home Agent in the enterprise network then forwards the data packets to the Correspondent Node.

Similarly, as shown at 840, since the Correspondent Node is in Enterprise Network A, data packets are transmitted (e.g., tunneled) from the Correspondent Node to the Mobile Node via the Mobile Node's Home Agent in the enterprise network. However, this Home Agent is the secondary Home Agent for the Mobile Node. Therefore, data packets are transmitted to the Mobile Node's Home Agent in the Service Provider network via the Virtual Private Network (VPN). The Mobile Node's Home Agent in the Service Provider network then forwards the data packets to the Mobile Node, as the Mobile Node's serving Home Agent.

Data flow between the Mobile Node and the CN when the CN is in the Service Provider network is represented at 842. As shown at 843, when the Mobile Node is in the enterprise network, traffic may be sent to and from the Mobile Node, as shown. Data packets are transmitted from the Mobile Node to the Correspondent Node as shown at 844 via the Mobile Node's Home Agent in the enterprise network. The data packets are tunneled to the Mobile Node's Home Agent in the Service Provider network via the Virtual Private Network (VPN). The Home Agent in the Service Provider network then forwards the data packets to the Correspondent Node.

Similarly, as shown at 846, since the Correspondent Node is in the Service Provider network, data packets are transmitted from the Correspondent Node to the Mobile Node via the Mobile Node's Home Agent in the Service Provider network. Since the Home Agent is the secondary Home Agent for the Mobile Node, the data packets are tunneled to the Mobile Node's Home Agent in the enterprise network via the Virtual Private Network (VPN). The Home Agent in the enterprise network then forwards the data packets to the Mobile Node, as the Mobile Node's serving Home Agent.

As shown at 847, when the Mobile Node roams to the Service Provider network, traffic may be sent to and from the Mobile Node, as shown. Specifically, as shown at 848 and 850, since both the Mobile Node and the Correspondent Node are in the Service Provider network, data packets are transmitted from the Mobile Node to the Correspondent Node and vice versa via the Mobile Node's Home Agent in the Service Provider network.

Data flow between the Mobile Node and the Correspondent Node (CN) when the CN is in Enterprise B is represented at 852. As shown at 853, when the Mobile Node is in the enterprise network, traffic may be sent to and from the Mobile Node, as shown. Specifically, as shown at 854, data packets are transmitted (e.g., tunneled) from the Mobile Node to the Correspondent Node via the Mobile Node's Home Agent in Enterprise network B. The data packets are then processed by a Network Address Translation (NAT) module in the enterprise network and transmitted to the Correspondent Node. Similarly, as shown at 856, when the Correspondent Node sends data packets to the Mobile Node, the data packets are translated by the same NAT module for that data flow (in the enterprise network) and forwarded to the Mobile Node's Home Agent in the enterprise network. The Home Agent then tunnels the data packets to the Mobile Node.

The Mobile Node roams to the Service Provider network at 857. As shown at 858, when the Mobile Node sends data packets to the CN, since the Mobile Node is in the Service Provider network, the data packets are transmitted via the Mobile Node's Home Agent in the Service Provider network. The data packets are transmitted to the Mobile Node's Home Agent in the enterprise network via the VPN. The data packets are then processed by the same NAT module in the enterprise network and forwarded to the CN.

Similarly, as shown at 860, when the CN sends data packets to the Mobile Node, the data packets are translated by the same NAT module in the enterprise network. Since the CN is in the enterprise network, the data packets are then forwarded to the Mobile Node's Home Agent in the enterprise network. Since this Home Agent is the secondary Home Agent for the Mobile Node, the data packets are tunneled to the Mobile Node's Home Agent in the Service Provider network via the VPN. The Home Agent in the Service Provider network then forwards the data packets to the Mobile Node, as the Mobile Node's serving Home Agent.

As described above with reference to FIGS. 7-8B, packets that are not transmitted locally are forwarded to the network and NAT module that has previously processed packets for that session. In order to identify a particular data flow, information may be obtained from each data packet and stored in a policy routing table. FIG. 9 is a diagram illustrating an exemplary policy routing table that may be implemented in a system such as that illustrated in FIG. 7. As shown in FIG. 9, a data flow may be identified by a Source IP address 902, Source Port 904, Destination IP Address 906, and Destination Port 908. In addition, a session in Mobile IPv6 may be identified by a Flow Identifier 910. Other information may also be used to further identify a data flow. For instance, a GRE key may be stored. For each entry, it is possible to identify the previous action taken, as shown in FIG. 7. For instance, the packet may be tunneled to the Service Provider Home Agent.

The disclosed embodiments enable Service Providers to provide value added services, including mobility and enterprise access. As a result, enterprise employees are able to be mobile and access enterprise services while roaming in the Service Provider network. In addition, the routing path for enterprise and Service Provider services may be optimized.

It is important to note that although the examples described herein disclose a single Home Agent implemented in the enterprise network and corresponding Service Provider network, multiple Home Agents may be implemented in the enterprise network as well as in the Service Provider network. This may be desirable, for example, to implement Home Agent redundancy. In this manner, a backup Home Agent may be implemented for a Home Agent implemented within a particular network.

The apparatus (e.g. Mobile Node, Home Agent, or Correspondent Node) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents of this invention may be implemented by specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 10:
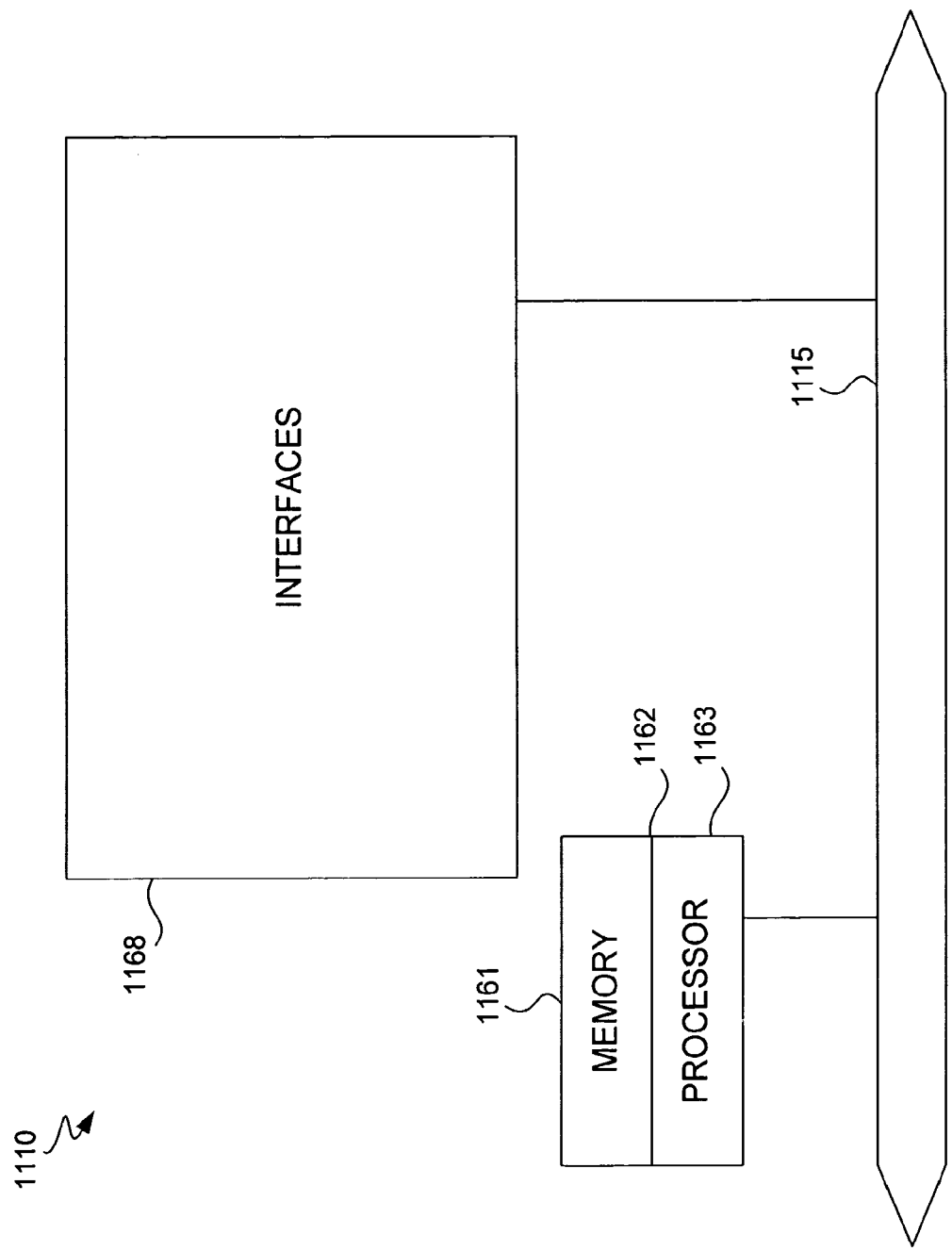
FIG. 10 is a diagrammatic representation of a router in which embodiments of the present invention may be implemented.

Referring now to FIG. 10, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 10 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for authentication and registration functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a computer-readable medium in which a carrier wave travels over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Moreover, although the example described refers primarily to IPv4, the present invention may be used with other versions of IP. Moreover, it is important to note that a Mobile Node may be a Mobile Router. Therefore, the described embodiments should be taken as illustrative and not restrictive, and the invention should not be limited to the details given herein but should be defined by the following claims and their full scope of equivalents.

What is claimed is:

1. A Home Agent comprising:
   a processor; and
   a memory having stored therein instructions which, when executed by the processor, cause the processor to perform operations comprising:
   receiving, from a Mobile Node, a registration request comprising a care-of address;
   updating a mobility binding table associated with the Home Agent and the Mobile Node, the updated mobility binding table including a primary binding for the Mobile Node, wherein the primary binding associates the Mobile Node with the care-of address, the Home Agent being a first Home Agent; and
   sending a notification to a second Home Agent indicating that the first Home Agent is a serving Home Agent for the Mobile Node;
   processing and routing to the Mobile Node, data received at the first Home Agent from the second Home Agent;
   receiving a notification from at least one third Home Agent indicating that the at least one third Home Agent is the serving Home Agent for the Mobile Node;
   updating the mobility binding table to change a binding between the first Home Agent and the Mobile Node to a secondary binding; and
   forwarding data received at least one of the first Home Agent or the second Home Agent for the Mobile Node to the at least one third Home Agent for further processing and routing to the Mobile Node.

2. The Home Agent of claim 1, wherein the first Home Agent and the second Home Agent comprise a set of associated Home Agents.

3. The Home Agent of claim 1, wherein the primary binding comprises an indication that the first Home Agent is acting as the serving Home Agent for the Mobile Node.

4. The Home Agent of claim 1, wherein the notification further comprises an indication that the Mobile Node is registered with the first Home Agent.

5. The Home Agent of claim 1, the operations further comprising:
   processing data packets addressed to the Mobile Node; and
   forwarding the data packets to the Mobile Node.

6. The Home Agent of claim 1, wherein the registration request includes an Internet Protocol (IP) address of the first Home Agent.

7. The Home Agent of claim 1, wherein the registration request comprises an indication that the first Home Agent is to act as the serving Home Agent for the Mobile node.

8. The Home Agent of claim 1, the operations further comprising based on the registration request, registering the Mobile Node with the first Home Agent.

9. The Home Agent of claim 8, wherein registering the Mobile Node comprises authenticating the Mobile Node.

10. A method comprising:
    receiving, by a first Home Agent and from a Mobile Node, a registration request comprising a care-of address;
    updating, by the first Home Agent, a mobility binding table associated with the first Home Agent, the mobility binding table including a primary binding for the Mobile Node, wherein the primary binding associates the Mobile Node with the care-of address; and
    sending, by the first Home Agent, a notification to a second Home Agent indicating that the first Home Agent is a serving Home Agent for the Mobile Node;
    processing and routing to the Mobile Node, data received at the first Home Agent from the second Home Agent;
    receiving a notification from at least one third Home Agent indicating that the at least one third Home Agent is the serving Home Agent for the Mobile Node;
    updating the mobility binding table to change a binding between the first Home Agent and the Mobile Node to a secondary binding; and
    forwarding data received at least one of the first Home Agent or the second Home Agent for the Mobile Node to the at least one third Home Agent for further processing and routing to the Mobile Node.

11. The method of claim 10, wherein the first Home Agent and the second Home Agent comprise a set of associated Home Agents.

12. The method of claim 10, wherein the primary binding comprises an indication that the first Home Agent is acting as the serving Home Agent for the Mobile Node.

13. The method of claim 10, wherein the notification further comprises an indication that the Mobile Node is registered with the first Home Agent.

14. The method of claim 10, further comprising:
    processing data packets addressed to the Mobile Node; and
    forwarding the data packets to the Mobile Node.

15. The method of claim 10, wherein the registration request includes an Internet Protocol (IP) address of the first Home Agent.

16. The method of claim 10, wherein the registration request comprises an indication that the first Home Agent is to act as the serving Home Agent for the Mobile node.

17. A computer-readable storage medium having stored therein instructions which, when executed by the processor, cause the processor to perform operations comprising:
    receiving, from a Mobile Node, a registration request comprising a care-of address;
    updating a mobility binding table associated with the Home Agent and the Mobile Node, the updated mobility binding table including a primary binding for the Mobile Node, wherein the primary binding associates the Mobile Node with the care-of address, the Home Agent being a first Home Agent; and
    sending a notification to a second Home Agent indicating that the first Home Agent is a serving Home Agent for the Mobile Node;

processing and routing to the Mobile Node, data received at the first Home Agent from the second Home Agent;

receiving a notification from at least one third Home Agent indicating that the at least one third Home Agent is the serving Home Agent for the Mobile Node;

updating the mobility binding table to change a binding between the first Home Agent and the Mobile Node from the primary bonding to a secondary binding; and forwarding data received at least one of the first Home Agent or the second Home Agent for the Mobile Node to the at least one third Home Agent for further processing and routing to the Mobile Node.

18. The media of claim 17, wherein the primary binding comprises an indication that the first Home Agent is acting as the serving Home Agent for the Mobile Node.

19. The media of claim 17, wherein the notification further comprises an indication that the Mobile Node is registered with the first Home Agent.

20. The media of claim 17, the operations further comprising processing data packets addressed to the Mobile Node; and forwarding the data packets to the Mobile Node.

\* \* \* \* \*